(12) United States Patent
Koike et al.

(10) Patent No.: US 7,750,967 B2
(45) Date of Patent: Jul. 6, 2010

(54) IMAGE CAPTURING APPARATUS, ELECTRONIC APPARATUS, DISPLAY METHOD, AND PROGRAM

(75) Inventors: Tatsunobu Koike, Kanagawa (JP); Yuuji Takimoto, Tokyo (JP); Noriaki Nakagawa, Tokyo (JP); Masahiro Takahashi, Kanagawa (JP); Kayo Sasaki, Tokyo (JP)

(73) Assignee: Sony Corporation (JP)

( * ) Notice: Subject to any disclaimer, the term of this patent is extended or adjusted under 35 U.S.C. 154(b) by 513 days.

(21) Appl. No.: 11/728,977

(22) Filed: Mar. 27, 2007

(65) Prior Publication Data

US 2007/0258005 A1 Nov. 8, 2007

(30) Foreign Application Priority Data

Mar. 31, 2006 (JP) ............................ P2006-098020

(51) Int. Cl.
*H04N 5/225* (2006.01)
(52) U.S. Cl. .............................. 348/333.02; 348/333.11
(58) Field of Classification Search ............ 348/333.01, 348/333.02, E5.047, 333.05, 333.11, 333.12
See application file for complete search history.

(56) References Cited

U.S. PATENT DOCUMENTS

| | | | |
|---|---|---|---|
| 5,760,773 A * | 6/1998 | Berman et al. ............... 715/808 |
| 6,674,464 B1 | 1/2004 | Mizutani et al. |
| 2003/0064757 A1* | 4/2003 | Yamadera et al. ........... 455/566 |
| 2004/0051803 A1* | 3/2004 | Venturino et al. ...... 348/333.02 |
| 2005/0204311 A1 | 9/2005 | Kim |
| 2006/0238625 A1 | 10/2006 | Sasaki et al. |

FOREIGN PATENT DOCUMENTS

| | | |
|---|---|---|
| CN | 1668075 A | 9/2005 |
| JP | 2000-092376 A | 3/2000 |
| JP | 2001-209482 A | 8/2001 |
| JP | 2001-211368 A | 8/2001 |
| WO | 2004-102954 A1 | 11/2004 |

* cited by examiner

*Primary Examiner*—Tuan Ho
(74) *Attorney, Agent, or Firm*—Lerner, David, Littenberg, Krumholz & Mentlik, LLP

(57) ABSTRACT

An image capturing apparatus may include a function holding unit configured to hold functions of the image capturing apparatus, the functions being classified into corresponding categories; an identifier holding unit configured to hold category identifiers indicating the categories and function identifiers indicating the functions; a category display control unit configured to allow the category identifiers to be displayed along the horizontal direction; a function display control unit configured to allow the function identifiers corresponding to the category to be operated in accordance with an operation input to be displayed along the vertical direction; and an operation accepting unit configured to accept an operation input for selecting one of the function identifiers displayed by the function display control unit.

15 Claims, 20 Drawing Sheets

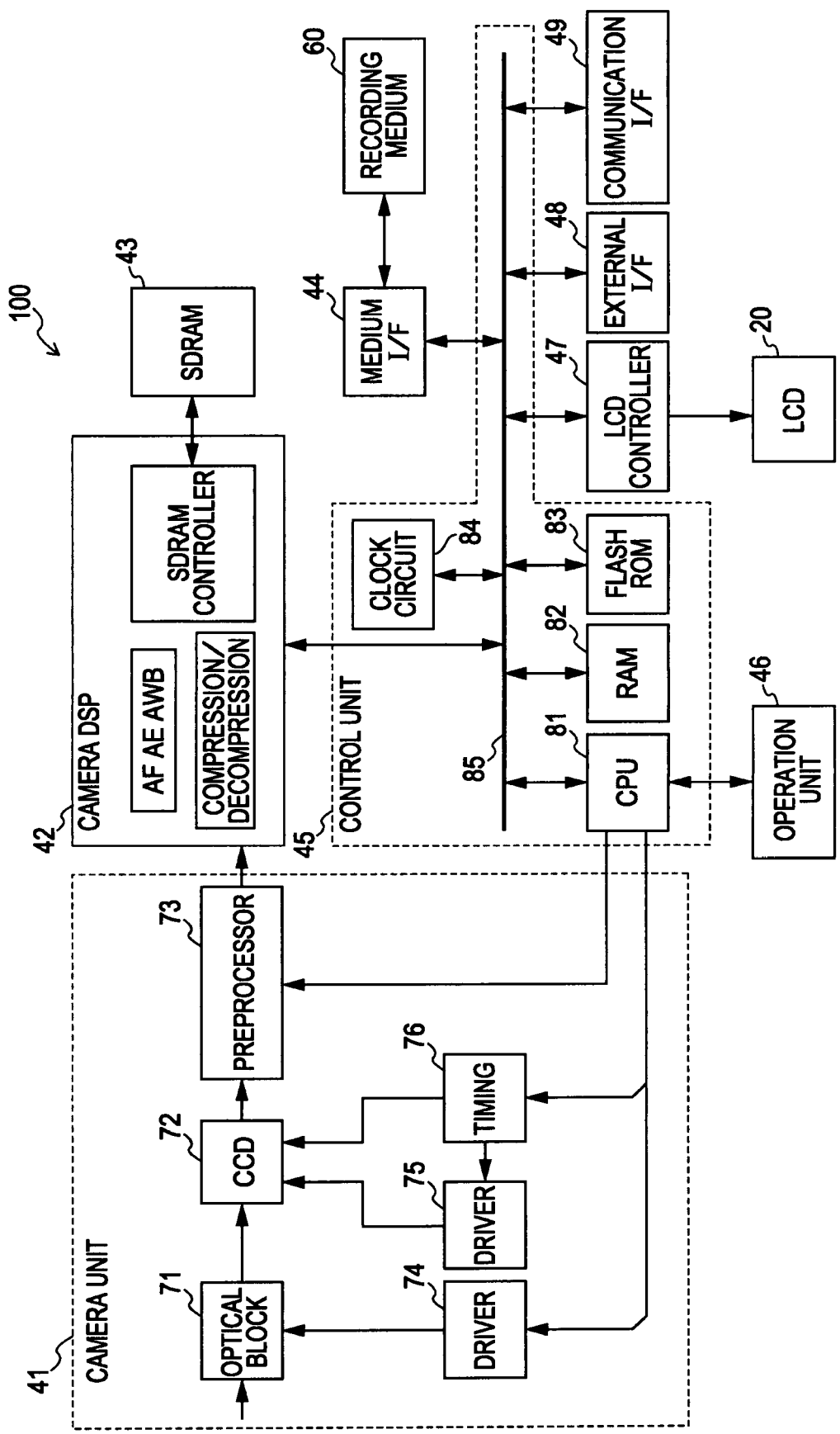

FIG. 5

| CATEGORYS (510) | FUNCTIONS (520) | EXPLANATIONS (530) |
|---|---|---|
| CAMERA | STILL IMAGE | CAPTURE STILL IMAGE. |
| | MOVING IMAGE | CAPTURE MOVING IMAGE WITH VOICE. |
| VIEWER | ALBUM | PLAY BACK IMAGE IN ALBUM (BUILT-IN MEMORY). |
| | MEMORY STICK | PLAY BACK IMAGE IN MEMORY STICK. |
| | LAST-CAPTURED IMAGE | PLAY BACK LAST-CAPTURED IMAGE. |
| | LAST-VIEWED IMAGE | PLAY BACK LAST-VIEWED IMAGE. |
| | SLIDE SHOW | AUTOMATICALLY PLAY BACK IMAGES WITH BGM/EFFECT. |
| MUSIC | MUSIC PLAYER | PLAY BACK MUSIC. |
| COMMUNICATION | EXCHANGE OF IMAGES DURING SHOOTING | EXCHANGE IMAGES BETWEEN WIRELESSLY-CONNECTED CAMERAS DURING SHOOTING. |
| | EXCHANGE OF IMAGES DURING PLAYBACK | EXCHANGE IMAGES BETWEEN WIRELESSLY-CONNECTED CAMERAS. |
| TOOL BOX | PRINT | PRINT STILL IMAGE. |
| | RELEASE OF IMAGES | RELEASE IMAGES ON NETWORK CONNECTED TO WIRELESS LAN. |
| MEDIA TOOL | GENERAL OPERATIONS | PERFORM OPERATION ABOUT RECORDING MEDIUM, SUCH AS CHECK OF RECORDABLE AREA OR SETTING OF FILE NAME. |
| | MEMORY STICK | PERFORM OPERATION ABOUT MEMORY STICK, SUCH AS SETTING OF FOLDER. |
| | BUILT-IN MEMORY | PERFORM OPERATION ABOUT BUILT-IN MEMORY, SUCH AS FORMAT. |
| SETTING | SETTING OF MAIN BODY | CHANGE SETTING OF MAIN BODY. |
| | SETTING OF CLOCK | CHANGE SETTING OF CLOCK. |
| | SETTING OF CAMERA | CHANGE SETTING OF CAMERA FUNCTION. |
| | SETTING OF MUSIC | CHANGE SETTING OF MUSIC FUNCTION. |
| | SETTING OF NETWORK | CHANGE SETTING OF COMMUNICATION FUNCTION. |

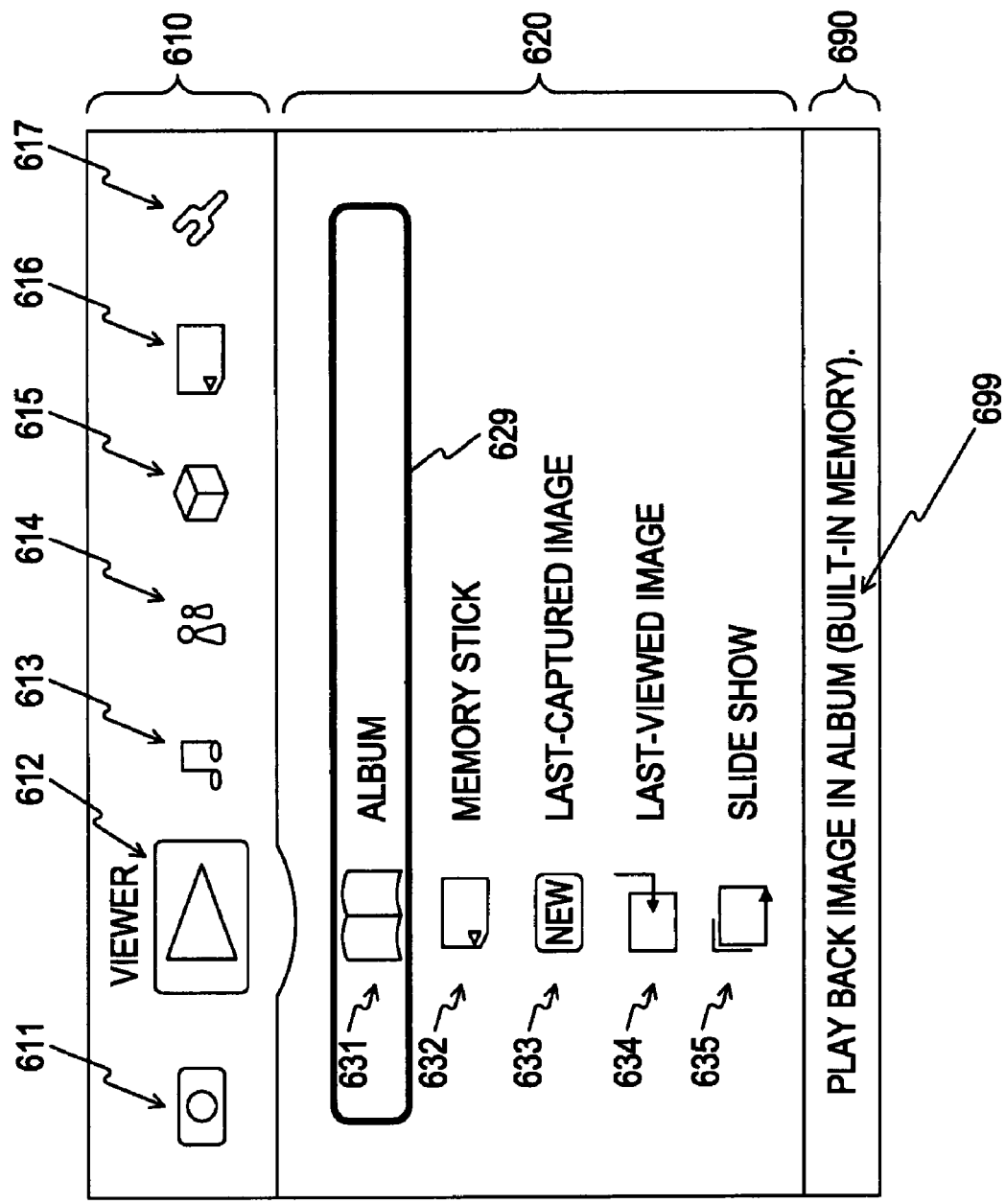

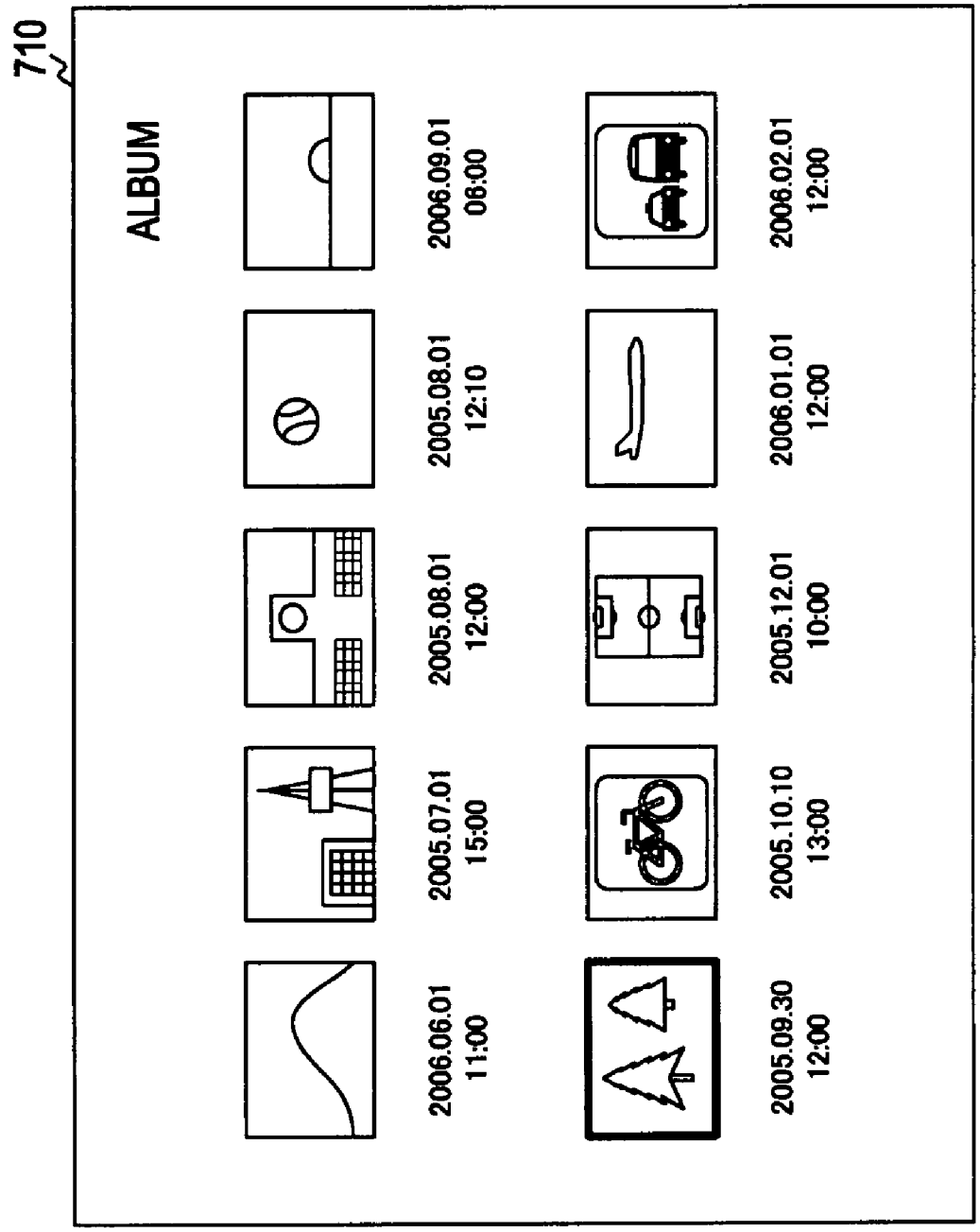

PRINT

SELECT ITEM TO BE PRINTED.

ALBUM

MEMORY STICK

DPOF PRINT

RELEASE OF IMAGE

CONNECT TO NETWORK.

EXECUTION

SETTING OF ACCESS POINT

IMAGE CAPTURING APPARATUS, ELECTRONIC APPARATUS, DISPLAY METHOD, AND PROGRAM

CROSS-REFERENCE TO RELATED APPLICATIONS

This application claims priority from Japanese Patent Application No. JP 2006-098020 filed in the Japanese Patent Office on Mar. 31, 2006, the entire content of which is incorporated herein by reference.

BACKGROUND OF THE INVENTION

1. Field of the Invention

The present invention relates to an electronic apparatus, particularly to an image capturing apparatus, a display method therein, and a program allowing a computer to execute the method.

2. Description of the Related Art

An electronic apparatus, such as a digital still camera, is provided with buttons or the like corresponding to functions to be provided, and the buttons receive an operation input from a user (e.g., see Patent Document 1: Japanese Unexamined Patent Application Publication No. 2000-092376 (FIG. 1)). The user selects a button corresponding to a desired function from among the buttons and presses the selected button so as to perform an operation.

SUMMARY OF THE INVENTION

However, if a new button or the like is provided every time a new function is added to the electronic apparatus, the cost of components increases accordingly and miniaturization of the electronic apparatus may be inhibited. Furthermore, the user selects a button corresponding to a desired function from among many buttons, which may deteriorate user-friendliness.

Also, in a case where respective functions are provided in a GUI (graphical user interface) method by software, it is not always easy for a user to select an item corresponding to a desired function from among many items if the user is not familiar with the apparatus.

The present invention is directed to systematically displaying functions provided by an electronic apparatus by a GUI, so as to improve user-friendliness.

According to an embodiment of the present invention, an image capturing apparatus may include function holding means for holding functions of the image capturing apparatus, the functions being classified into corresponding categories; identifier holding means for holding category identifiers indicating the categories and function identifiers indicating the functions; category display control means for allowing the category identifiers to be displayed along the horizontal direction; function display control means for allowing the function identifiers corresponding to the category to be operated in accordance with an operation input to be displayed along the vertical direction; and operation accepting means for accepting an operation input for selecting one of the function identifiers displayed by the function display control means. With this configuration, the functions provided by the image capturing apparatus may be systematically displayed while being classified into categories. The category identifiers and the function identifiers may include icons or names indicating the categories and functions, respectively.

The function holding means may further hold function explanations corresponding to the functions. The image capturing apparatus may further include function explanation display control means for allowing the function explanation corresponding to the function selected by the operation input to be displayed. With this configuration, explanation of the selected function can be displayed.

The category display control means may allow the category identifiers to be displayed above the function identifiers. In this case, the function display control means may allow the function identifiers corresponding to the category identifier of the category to be operated by the operation input to be displayed under the category identifier. On the other hand, the category display control means may allow the category identifier corresponding to the category to be operated by the operation input to be displayed at a fixed position, and, upon change of the category to be operated by the operation input, the category display control means may move the category identifiers so that the category identifier corresponding to the category to be newly operated is displayed at the fixed position. With this configuration, a user can recognize the category to be operated by paying attention to the fixed position. All of the category identifiers may be displayed in an initial state.

The operation accepting means may include a menu button to activate or inactivate display of the category identifiers and the function identifiers controlled by the category display control means and the function display control means. With this configuration, a menu screen can be displayed at a desired timing. The operation accepting means may further include a special button to execute an assigned function. With this configuration, a specific function can be quickly executed without using the menu screen. In this case, the image capturing apparatus may further include control means for executing a predetermined function on the basis of the operation input accepted by the operation accepting means. In the control means, a function executed on the basis of selection of one of the function identifiers may be equal to a function executed by an operation of the special button.

The categories of the image capturing apparatus may include at least a category to capture an image of a subject, a category to play back a recorded image, and a category to transmit the recorded image through a network connected to the apparatus.

According to an embodiment of the present invention, an electronic apparatus may include function holding means for holding functions of the electronic apparatus, the functions being classified into corresponding categories; identifier holding means for holding category identifiers indicating the categories and function identifiers indicating the functions; operation accepting means for accepting an operation input to select one of the function identifiers; category display control means for performing control so that the category identifiers are displayed along the horizontal direction; and function display control means for performing control so that the function identifiers corresponding to the category to be operated in accordance with the operation input are displayed along the vertical direction. With this configuration, the functions provided by the electronic apparatus may be systematically displayed while being classified into categories.

According to an embodiment of the present invention, in an electronic apparatus may include function holding means for holding functions of the electronic apparatus, the functions being classified into corresponding categories; identifier holding means for holding category identifiers indicating the categories and function identifiers indicating the functions; and operation accepting means for accepting an operation input to select one of the function identifiers, a display method includes the steps of accepting the operation input;

determining whether a menu button has been pressed in the operation input; determining whether a menu is displayed if the menu button has been pressed; performing control so as to display the category identifiers along the horizontal direction and to display the function identifiers corresponding to the category to be operated in accordance with the operation input along the vertical direction as the menu if the menu is not displayed; and performing control so as to inactivate display of the menu if the menu is displayed. Also, according to an embodiment of the present invention, a program may allow a computer to execute those steps. Accordingly, the functions provided by the electronic apparatus may be systematically displayed while being classified into categories.

According to the embodiments of the present invention, the functions provided by the electronic apparatus may be systematically displayed by a GUI and user-friendliness may be improved advantageously.

BRIEF DESCRIPTION OF THE DRAWINGS

FIG. 1 is a block diagram showing a configuration of a digital still camera 100 as an example of an electronic apparatus according to an embodiment of the present invention;

FIG. 5 shows an example of a configuration of a function table 501 according to the embodiment of the present invention;

FIG. 6 shows an example of a screen about a "viewer" category according to the embodiment of the present invention;

FIG. 7 shows an example of a screen 710 of an "album" function according to the embodiment of the present invention;

FIG. 16 shows an example of a screen 750 of a "print" function according to the embodiment of the present invention;

FIG. 17 shows an example of a screen 760 of a "release of images" function according to the embodiment of the present invention;

DETAILED DESCRIPTION

Figure 2A:
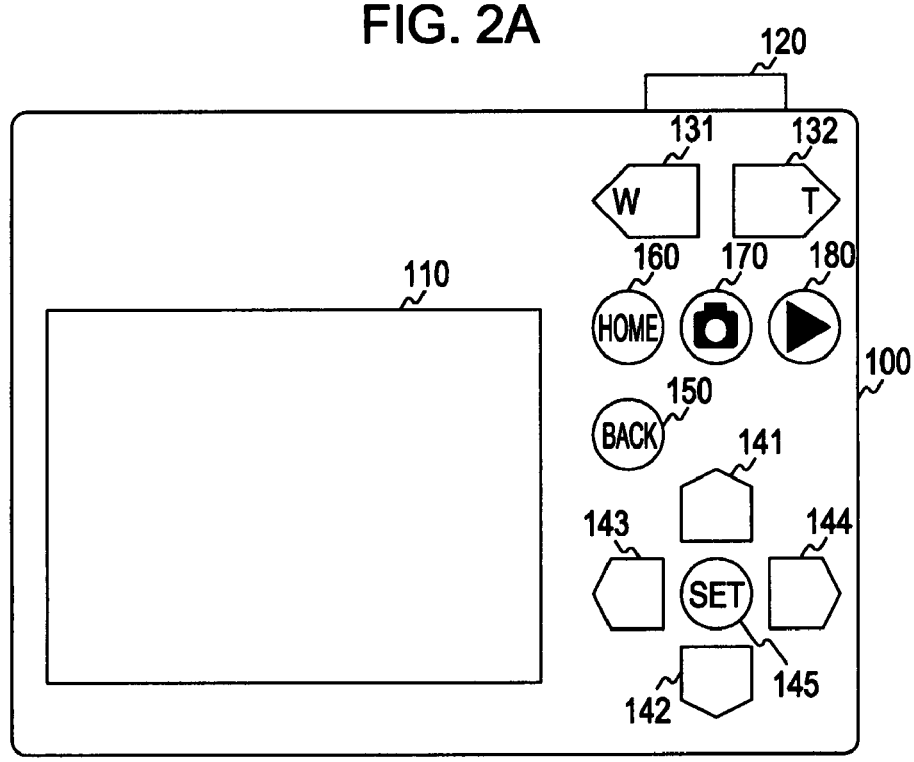
FIGS. 2A and 2B show an example of appearance of the digital still camera 100 as an example of the electronic apparatus according to the embodiment of the present invention.

Hereinafter, an embodiment of the present invention is described in detail with reference to the drawings.

FIG. 1 is a block diagram showing a configuration of a digital still camera 100, which is an example of an electronic apparatus according to the embodiment of the present invention. As shown in FIG. 1, the digital still camera 100 includes a camera unit 41, a camera DSP (digital signal processor) 42, an SDRAM (synchronous dynamic random access memory) 43, a medium interface (hereinafter referred to as a medium I/F) 44, a control unit 45, an operation unit 46, an LCD (liquid crystal display) controller 47, an LCD 20, an external interface (hereinafter referred to as an external I/F) 48, and a communication interface (hereinafter referred to as a communication I/F) 49. Also, a recording medium 60 can be loaded into the digital still camera 100.

The recording medium 60 may be a so-called memory card using a semiconductor memory, an optical recording medium such as a recordable DVD (digital versatile disc) or a recordable CD (compact disc), or a magnetic disc. In this embodiment, a memory card including a semiconductor memory or a hard disk drive is used as the recording medium 60.

As shown in FIG. 1, the camera unit 41 includes an optical block 71, a CCD (charge coupled device) 72, a preprocessor 73, an optical block driver 74, a CCD driver 75, and a timing generator 76. Herein, the optical block 71 includes a lens, a focusing mechanism, a shutter mechanism, and an iris mechanism. Also, the optical block 71 includes a lens unit.

In the control unit 45, a CPU (central processing unit) 81, a RAM (random access memory) 82, a flash ROM (read only memory) 83, and a clock circuit 84 are connected to each other via a system bus 85. The control unit 45 includes, for example, a general-purpose built-in microcomputer or a dedicated system LSI (large scale integrated circuit). The control unit 45 can control each unit of the digital still camera 100.

The RAM 82 is mainly used as a work area, for example, in order to temporarily store an intermediate result of a process. The flash ROM 83 stores various programs executed in the CPU 81 and data required in processes. The clock circuit 84 can provide a present date, a present day, a present time, and date and time of shooting.

During image capturing, the optical block driver 74 generates a drive signal to operate the optical block 71 in accordance with control by the control unit 45, and supplies the drive signal to the optical block 71 so as to operate the optical block 71. In accordance with the drive signal from the optical block driver 74, the focusing mechanism, the shutter mechanism, and the iris mechanism of the optical block 71 are controlled. The optical block 71 captures an optical image of a subject and allows the CCD 72 to form an image.

The CCD 72 performs photoelectric conversion on the optical image from the optical block 71 and outputs an electric signal of the image obtained through the conversion. That is, the CCD 72 operates in accordance with a drive signal from the CCD driver 75, captures an optical image of a subject from the optical block 71, and supplies the captured image (image information) of the subject in a form of electric signal to the preprocessor 73 on the basis of a timing signal supplied from the timing generator 76, which is controlled by the control unit 45.

The CCD 72 may be replaced by a photoelectric converting device, such as a CMOS (complementary metal-oxide semiconductor) sensor.

As described above, the timing generator 76 generates a timing signal to provide predetermined timing in accordance with control by the control unit 45. The CCD driver 75 generates a drive signal to be supplied to the CCD 72 on the basis of the timing signal supplied from the timing generator 76.

The preprocessor 73 performs a CDS (correlated double sampling) process on the image information of the electric signal supplied from the CCD 72 in order to keep a favorable S/N ratio, performs an AGC (automatic gain control) process in order to control gain, and performs A/D (analog/digital) conversion in order to generate image data in a form of a digital signal.

The image data in a form of a digital signal generated in the preprocessor 73 is supplied to the camera DSP 42. The camera DSP 42 performs a camera signal process, such as an AF (auto focus), an AE (auto exposure), and AWB (auto white balance), on the supplied image data. The image data that has been processed with various adjustments is encoded by a predetermined encoding method, such as JPEG (Joint Photographic Experts Group) or JPEG 2000, is supplied to the recording medium 60 loaded into the digital still camera 100 according to this embodiment via the system bus 85 and the medium I/F 44, and is recorded as a file on the recording medium 60 in the manner described below.

In the image data recorded on the recording medium 60, a desired piece of image data is read from the recording medium 60 via the medium I/F 44 in accordance with an operation input from a user accepted via the operation unit 46, which includes a touch panel and a control key, and the read data is supplied to the camera DSP 42. The operation unit 46 includes zoom buttons 131 and 132, direction buttons 141 to 144, a set button 145, a back button 150, a home button 160, an image capturing button 170, a playback button 180, and a shutter button 120.

The camera DSP 42 decodes the encoded image data that has been read from the recording medium 60 and that has been supplied via the medium I/F 44 and supplies the decoded image data to the LCD controller 47 via the system bus 85. The LCD controller 47 generates an image signal to be supplied to the LCD 20 on the basis of the supplied image data and supplies the image signal to the LCD 20. Accordingly, an image corresponding to the image data recorded on the recording medium 60 is displayed on a screen of the LCD 20.

The digital still camera 100 according to this embodiment is also provided with the external I/F 48, via which the digital still camera 100 can be connected to an external personal computer or the like. Accordingly, the digital still camera 100 can receive image data from the personal computer, record the image data on the recording medium 60 loaded into the digital still camera 100, and supply the image data recorded on the recording medium 60 to the external personal computer or the like.

The communication I/F 49 includes a so-called network interface card (NIC), connects to a network, and obtains various image data and other information via the network.

Also, information including image data that has been obtained via an external personal computer or a network and that has been recorded on the recording medium can be read and played back in the digital still camera 100 according to this embodiment, and also can be displayed on the LCD 20, so that a user can use the information.

The communication I/F 49 can be provided as a wired interface compatible with a standard, such as IEEE (Institute of Electrical and Electronic Engineers) 1394 or USB (Universal Serial Bus), or can be provided as a wireless interface using an optical method or radio waves compatible with a standard, such as IEEE 802.11a, IEEE 802.11b, IEEE 802.11g, or Bluetooth. In other words, the communication I/F 49 may be either wired or wireless interface.

Figure 2B:
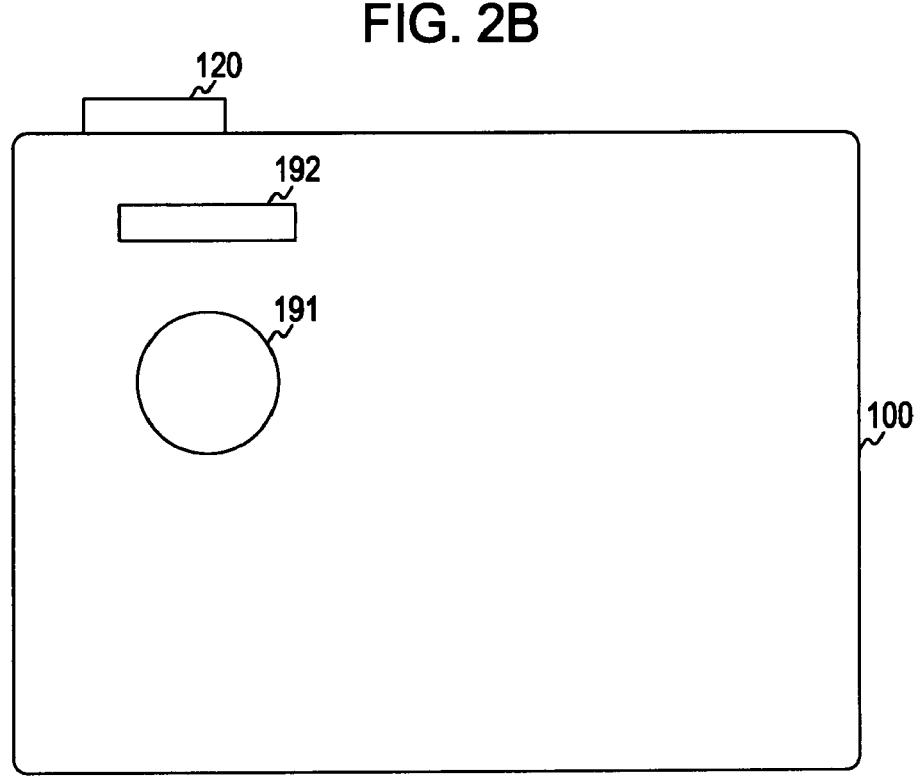

FIGS. 2A and 2B show appearance of the digital still camera 100, which is an example of the electronic apparatus according to the embodiment of the present invention. FIG. 2A shows an operation surface viewed from a photographer side. This operation surface of the digital still camera 100 is provided with a display 110, the zoom buttons 131 and 132, the direction buttons 141 to 144, the set button 145, the back button 150, the home button 160, the image capturing button 170, and the playback button 180. Also, the shutter button 120 to accept instructions to record a captured image is provided on an upper surface of the digital still camera 100. The display 110 corresponds to the above-described LCD 20, and the other buttons correspond to the above-described operation unit 46.

The display 110 displays captured images, played back images, and a menu described below. The zoom buttons 131 and 132 accept an operation of zooming an image. The direction buttons 141 to 144 accept an operation of indicating a direction about content displayed on the display 110. The set button 145 accepts an operation of setting a selection about content displayed on the display 110. The back button 150 accepts an operation of returning to a previous operation layer about content displayed on the display 110.

The home button 160 accepts an operation of shifting to a menu screen. That is, if the menu screen is not displayed, the menu screen appears upon press on the home button 160 (activation). If the menu screen is displayed, the menu screen disappears upon press on the home button 160 (inactivation).

The image capturing button 170 accepts an operation of shifting to a screen to capture a still or moving image. The playback button 180 accepts an operation of shifting to a screen to display a captured image. The screen displayed upon press on the image capturing button 170 or the playback button 180 can be accessed from the menu screen, but specific buttons may be assigned to frequently-used screens. Such buttons are called special buttons in the following description.

FIG. 2B shows a front surface viewed from a subject side. The front surface of the digital still camera 100 is provided with a lens 191 to capture images and a strobe light emitting unit 192 to emit strobe light. A sliding cover functioning as a lens cover may be provided in front of the lens 191.

Figure 3:
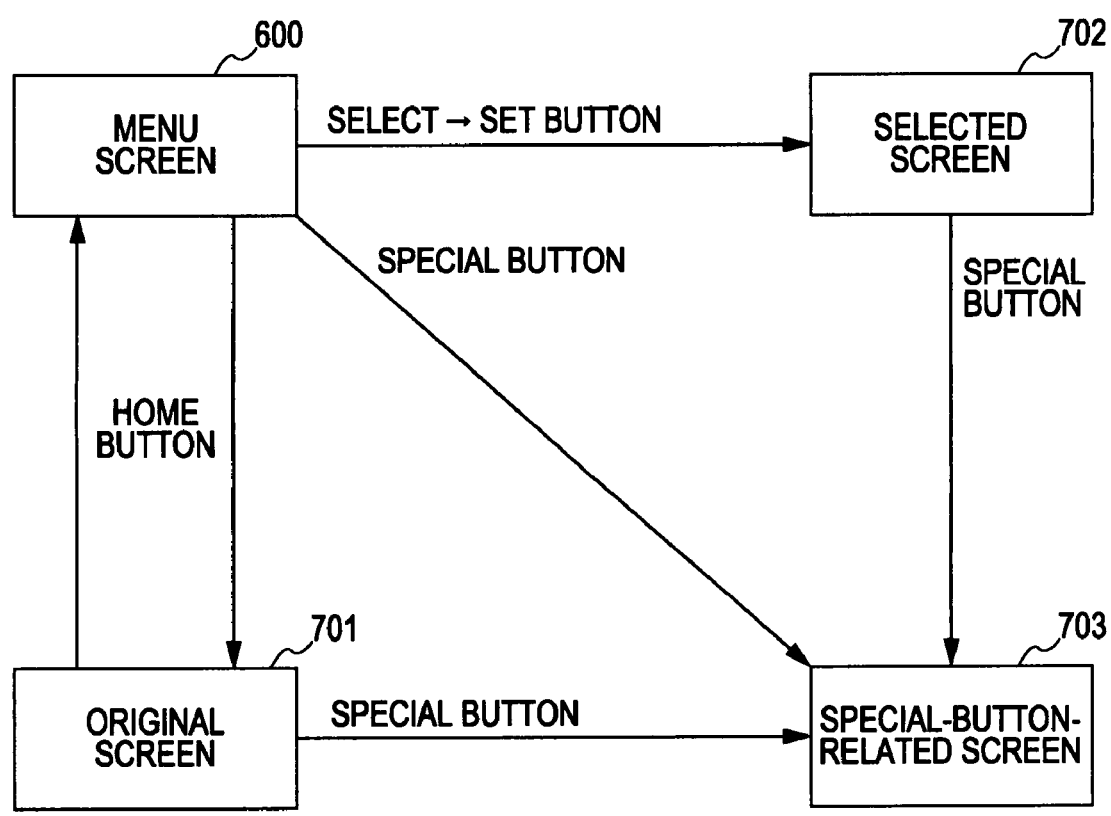
FIG. 3 shows an example of transition of screens according to the embodiment of the present invention.

FIG. 3 shows an example of transition of screens according to the embodiment of the present invention. Herein, assume that a menu is not displayed in an initial state. In the initial state, for example, a still image capturing screen is displayed if the sliding cover is open at power-on, whereas a last-captured image is displayed if the sliding cover is closed at power-on.

An initial screen where the menu is not displayed is called an original screen. If the home button 160 is pressed under a state where the original screen 701 is displayed, a menu screen 600 is displayed. If the home button 160 is pressed again, the original screen 701 is displayed again.

At this time, the menu screen 600 may be displayed instead of the original screen 701, or may be displayed in front of the original screen 701. For example, the menu screen 600 may be displayed in front of the original screen 701 such that the menu screen 600 is translucently displayed.

In the menu screen 600, a screen for selecting each function is displayed as described below. A user can select a desired function by appropriately pressing the direction buttons 141 to 144. Upon press on the set button 145, a selected screen 702 corresponding to the function selected at that time is displayed.

In any screen, if a special button such as the image capturing button 170 or the playback button 180 is pressed, a special-button-related screen 703 corresponding to the function assigned to the special button is displayed. However, this is not applied under a special state, for example, during execution of a formatting process of a medium or removable medium provided in the digital still camera 100 or during execution of an updating process of firmware. That is, press on the special button is regarded as invalid and is ignored if a significant disadvantage occurs due to switching of the function that is currently being executed.

Figure 4:
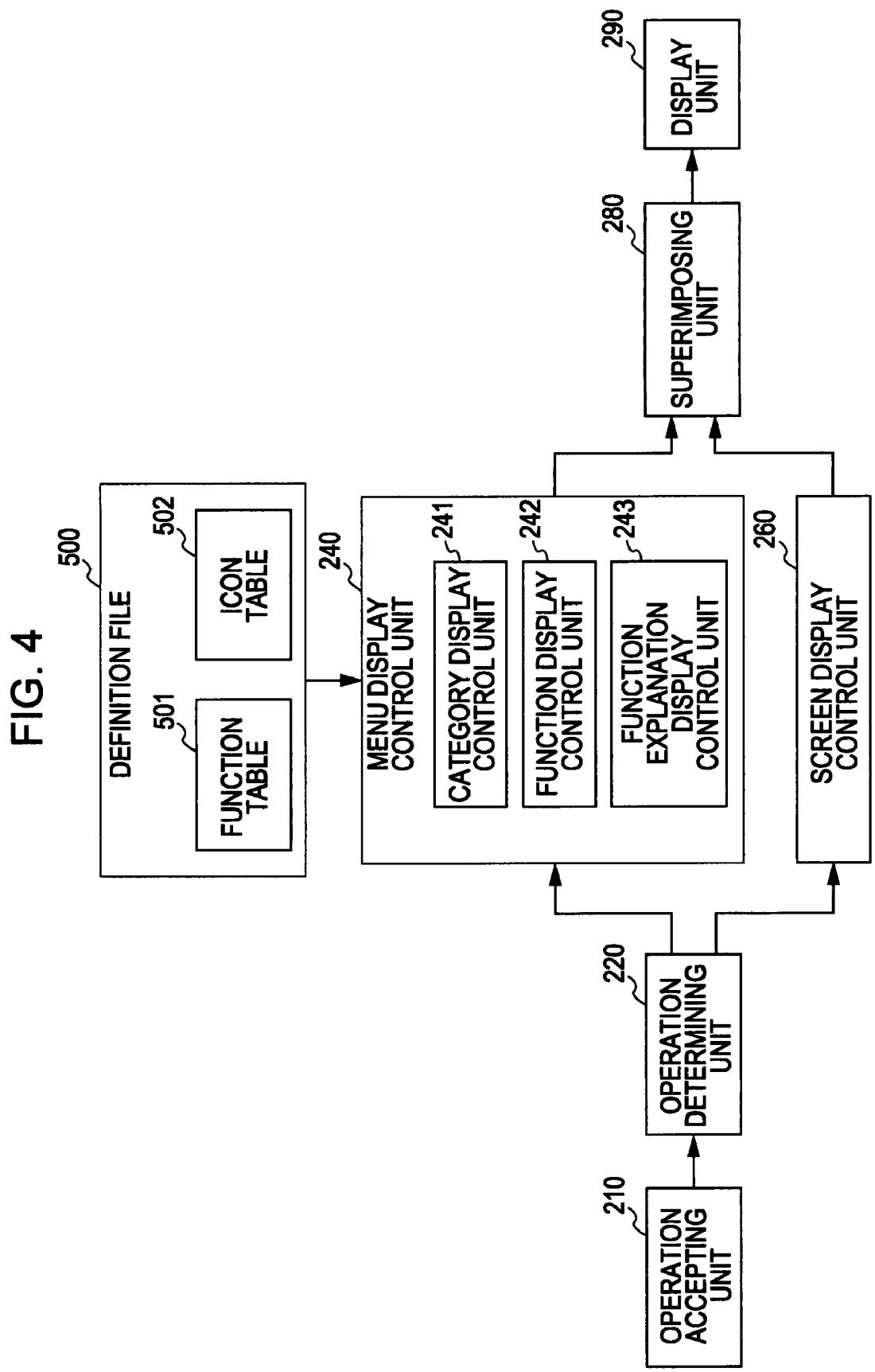
FIG. 4 shows an example of a functional configuration of the digital still camera 100 according to the embodiment of the present invention.

FIG. 4 shows an example of a functional configuration of the digital still camera 100 according to the embodiment of the present invention. This functional configuration includes an operation accepting unit 210, an operation determining unit 220, a menu display control unit 240, a screen display control unit 260, a superimposing unit 280, a display unit 290, and a definition file 500.

The operation accepting unit 210 accepts an operation input to the digital still camera 100. For example, the zoom buttons 131 and 132, the direction buttons 141 to 144, the set button 145, the back button 150, the home button 160, the image capturing button 170, and the playback button 180 on the operation surface shown in FIG. 2A correspond to the operation accepting unit 210.

The operation determining unit 220 determines the content of the operation input accepted by the operation accepting unit 210. Accordingly, the operation determining unit 220 instructs the menu display control unit 240 and the screen display control unit 260 to change the screen displayed.

The menu display control unit 240 controls display of the menu screen 600. The menu display control unit 240 includes a category display control unit 241, a function display control unit 242, and a function explanation display control unit 243. The category display control unit 241 allows category identifiers, indicating categories of functions of the digital still camera 100, to be displayed. The category identifiers include icons representing the categories and names of the categories. The function display control unit 242 allows function identifiers, indicating functions of the digital still camera 100, to be displayed. The function identifiers include icons representing the functions and names of the functions. The function explanation display control unit 243 allows explanations of the functions of the digital still camera 100 to be displayed.

The screen display control unit 260 allows screens provided by the digital still camera 100 except the menu screen 600 (e.g., the screens 701 to 703) to be displayed. The superimposing unit 280 superimposes a screen controlled by the menu display control unit 240 and a screen controlled by the screen display control unit 260. The display unit 290 displays a screen generated by the superimposing unit 280. For example, the display 110 corresponds to the display unit 290.

The definition file 500 holds definition of functions provided by the digital still camera 100. The definition file 500 includes a function table 501 and an icon table 502. The function table 501 holds correspondence between functions of operations performed on the digital still camera 100 and categories, and explanation of each function. The icon table 502 holds icons of functions and categories of the digital still camera 100.

The menu display control unit 240 obtains necessary information from the definition file 500 so as to display the menu screen 600 on the display unit 290.

FIG. 5 shows an example of a configuration of the function table 501 according to the embodiment of the present invention. The function table 501 includes the following items: functions 520 of operations performed on the digital still camera 100, categories 510 to which the functions 520 belong; and function explanations 530, which are character strings to explain the functions 520.

In this example, the categories 510 of the functions 520 of the digital still camera 100 include "camera", "viewer", "music", "communication", "tool box", "media tool", and "setting".

"Camera" is a category including an image capturing function. Specifically, "camera" includes functions of "still image" and "moving image" as the functions 520. "Still image" is a function of capturing a still image. "Moving image" is a function of capturing a moving image.

"Viewer" is a category including an image playback function. Specifically, "viewer" includes functions of "album", "memory stick", "last-captured image", "last-viewed image", and "slide show" as the functions 520. "Album" is a function of playing back an image in an album held in a built-in memory (not shown) of the digital still camera 100. "Memory stick" is a function of playing back an image stored in a memory stick (not shown) loaded into the digital still camera 100. "Last-captured image" is a function of playing back a last-captured image. "Last-viewed image" is a function of playing back a last-viewed image. "Slide show" is a function of automatically playing back images with a BGM (background music) and an effect.

"Music" is a category including a music playback function. Specifically, "music" includes a function of "music player" as the functions 520. "Music player" is a function of playing back music.

"Communication" is a category including a communication function. Specifically, "communication" includes functions of "exchange of images during shooting" and "exchange of images during playback" as the functions 520. "Exchange of images during shooting" is a function of exchanging images between wirelessly-connected digital still cameras during shooting of a subject. "Exchange of images during playback" is a function of exchanging images to be released between wirelessly-connected cameras.

"Tool box" is a category including an image operating tool. Specifically, "tool box" includes functions of "print" and "release of images" as the functions 520. "Print" is a function of printing a still image. "Release of images" is a function of releasing images on a network connected via a wireless LAN (local area network).

"Media tool" is a category including a media operating tool. Specifically, "media tool" includes functions of "general operations", "memory stick", and "built-in memory" as the functions 520. "General operations" is a general operating function about a recording medium, such as check of a recordable area in a recording medium and setting of a file name. "Memory stick" is an operating function about a memory stick, such as setting of a folder. "Built-in memory" is an operating function about a built-in memory, such as a format.

"Setting" is a category including various setting functions. Specifically, "setting" includes functions of "setting of main body", "setting of clock", "setting of camera", setting of music", and "setting of network" as the functions 520. "Setting of main body" is a function of changing setting of the entire digital still camera 100. "Setting of clock" is a function of changing setting of a clock (not shown) of the digital still camera 100. "Setting of camera" is a function of changing setting of a function of the digital still camera 100 as a camera. "Setting of music" is a function of changing setting of a music function of the digital still camera 100. "Setting of network" is a function of changing setting of a communication function of the digital still camera 100.

Hereinafter, examples of screens according to the embodiment of the present invention are described with reference to the drawings.

FIG. 6 shows an example of a screen about the "viewer" category according to the embodiment of the present invention.

Icons of categories are displayed along the horizontal direction in a category display area 610 at an upper side of the screen. From the left, a "camera" icon 611, a "viewer" icon 612, a "music" icon 613, a "communication" icon 614, a "tool box" icon 615, a "media tool" icon 616, and a "setting" icon 617 are displayed. The second position from the left is a fixed position to be focused on (to be operated), and the "viewer" icon 612 is larger than the other icons. Also, characters "viewer" are displayed as a category name above the "viewer" icon 612.

The display in the category display area 610 is controlled by the category display control unit 241. The icons 611 to 617 are obtained from the icon table 502 in the definition file 500. The name of the category to be operated is obtained from the categories 510 in the function table 501.

In a function display area 620 in the middle of the screen, icons and names of the functions corresponding to the category selected in the category display area 610 are displayed along the vertical direction. From the top, an "album" icon 631, a "memory stick" icon 632, a "last-captured image" icon 633, a "last-viewed image" icon 634, and a "slide show" icon 635 are displayed together with their names. The function that is currently focused on (selected) is surrounded by a selection frame 629 and is larger than the other functions.

The display in the function display area 620 is controlled by the function display control unit 242. The icons 631 to 635 are obtained from the icon table 502 in the definition file 500. The names of the functions are obtained from the functions 520 in the function table 501.

In a function explanation display area 690 at the bottom of the screen, an explanation 699 of the selected function (in this example, "album") is displayed.

The display in the function explanation display area 690 is controlled by the function explanation display control unit 243. The function explanation 699 is obtained from the function explanations 530 in the function table 501.

If the set button 145 is pressed while the "album" icon 631 is surrounded by the selection frame 629, as in the example shown in FIG. 6, the "album" function that is currently selected starts and a screen of the "album" function is displayed.

FIG. 7 shows an example of a screen 710 of the "album" function according to the embodiment of the present invention.

In the screen 710 of the "album" function, a list of images in an album held in the built-in memory (not shown) of the digital still camera 100 is displayed. If one of the images is selected by press on the set button 145, the selected image is displayed.

If the set button 145 is pressed when the selection frame 629 is on the "memory stick" icon 632, a list of images stored in the memory stick (not shown) loaded into the digital still camera 100 is displayed in the same manner. Then, if one of the images is selected by press on the set button 145, the selected image is displayed.

Figure 8:
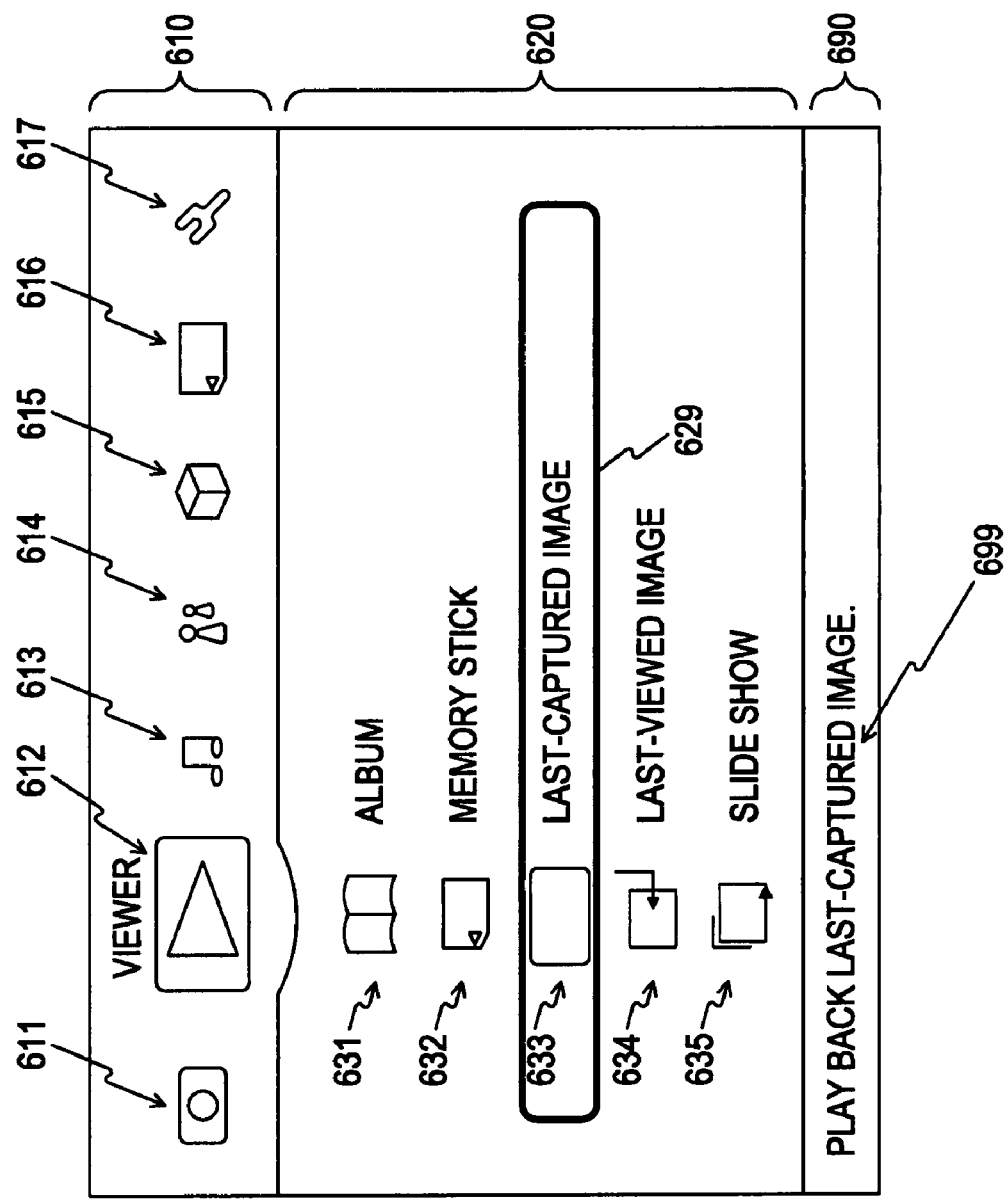
FIG. 8 shows another example of the screen about the "viewer" category according to the embodiment of the present invention.

FIG. 8 shows another example of the screen about the "viewer" category according to the embodiment of the present invention. If the down button 142 is pressed twice in the screen shown in FIG. 6, the screen shown in FIG. 8 is displayed.

In this screen, the "last-captured image" icon 633 is surrounded by the selection frame 629. Thus, the function explanation 699 about the "last-captured image" function is displayed in the function explanation display area 690. If the set button 145 is pressed in this state, a last-captured image is displayed.

Figure 9:
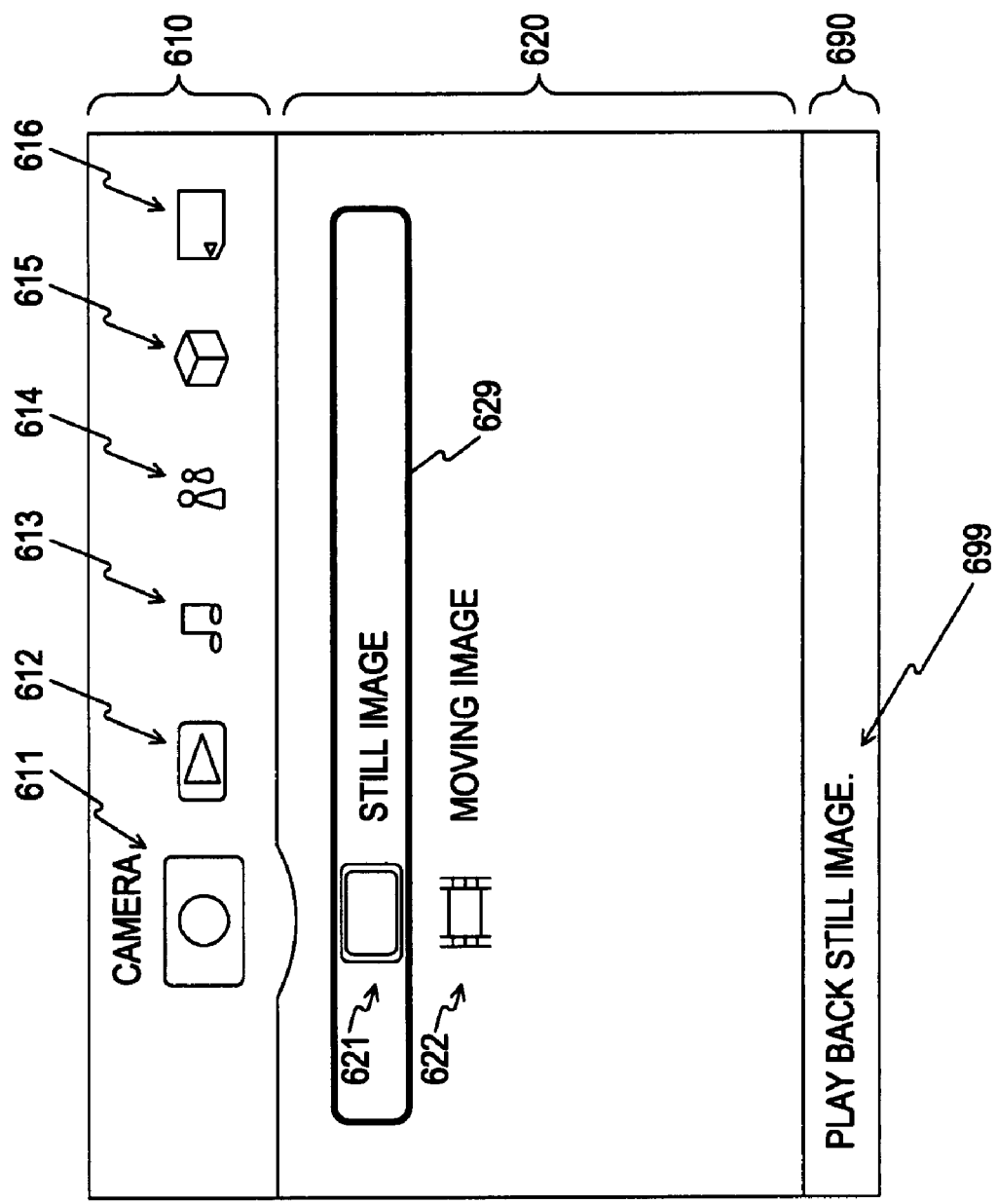
FIG. 9 shows an example of a screen about a "camera" category according to the embodiment of the present invention.

FIG. 9 shows an example of a screen about the "camera" category according to the embodiment of the present invention. If the right button 144 is pressed once in the screen shown in FIG. 6, the screen shown in FIG. 9 is displayed.

In this screen, the "camera" icon 611 and the category name "camera" are displayed at the fixed position to be operated. That is, the press on the right button 144 allows all of the category icons in the category display area 610 to be shifted in the right direction, so that the "setting" icon 617, which is positioned at the right end in FIG. 6, is hidden.

In this way, since the respective icons in the category display area 610 are shifted in the horizontal direction, some of the icons may be hidden depending on a relationship between a display width and the number of icons. Therefore, it is desirable to place the icons so that all of the categories can be seen in a display state that frequently occurs. For example, since the "viewer" category is displayed most frequently, the icons are placed so that all of the seven icons can be seen when the "viewer" icon 612 is displayed at the fixed position to be operated.

In the screen shown in FIG. 9, a "still image" icon 621 and a "moving image" icon 622 are displayed, and the "still image" icon 621 is surrounded by the selection frame 629. Accordingly, the function explanation 699 about the "still image" function is displayed in the function explanation display area 690. If the set button 145 is pressed in this state, a screen of the "still image" function is displayed.

Figure 10:
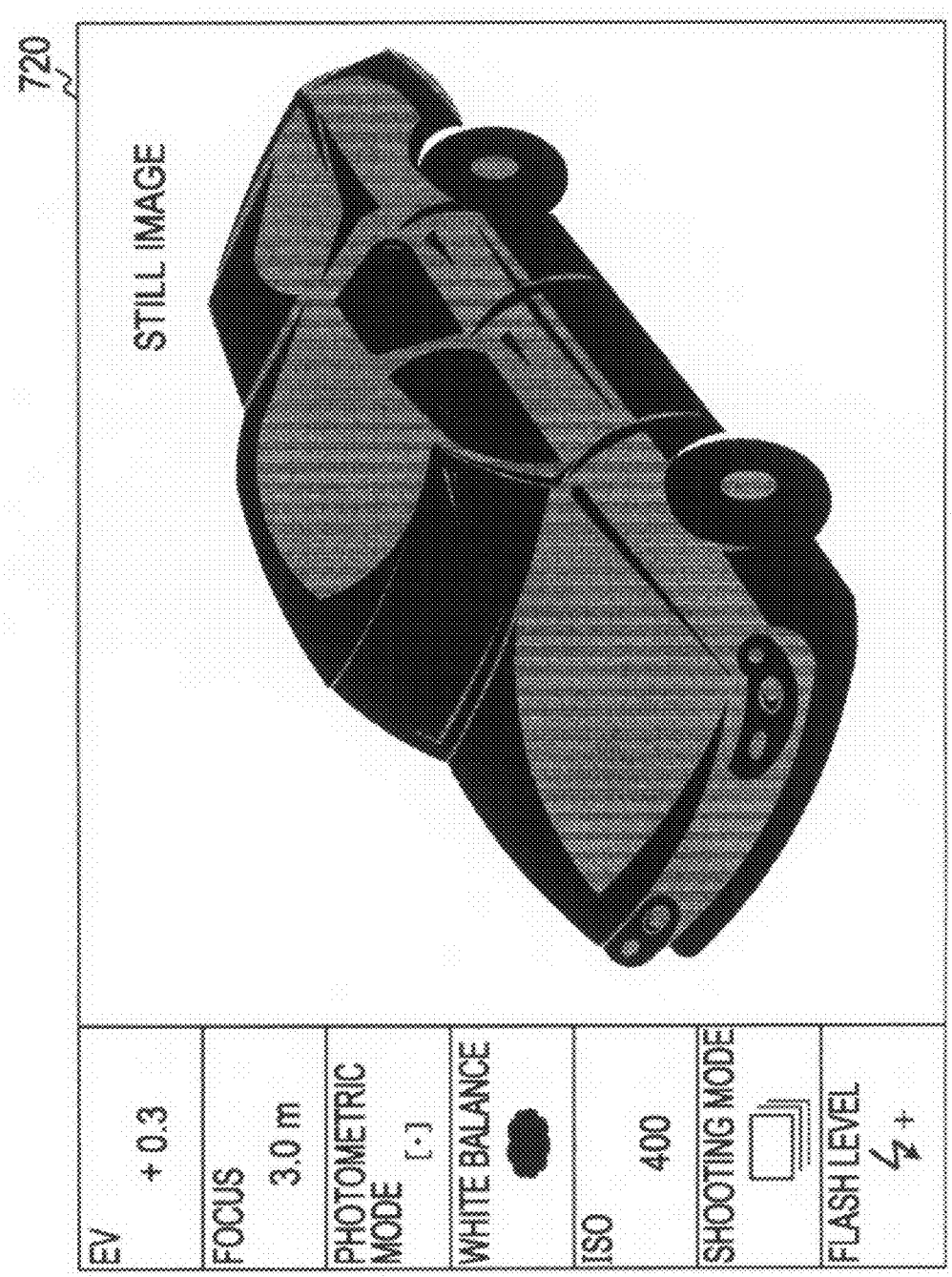
FIG. 10 shows an example of a screen 720 of a "still image" function according to the embodiment of the present invention.

FIG. 10 shows an example of a screen 720 of the "still image" function according to the embodiment of the present invention.

In this screen, an image of a current subject is displayed on the right side. Also, present shooting conditions are displayed on the left side, and setting can be changed if necessary. If the shutter button 120 is pressed in this state, the image of the subject at that time is recorded as a still image in a medium (not shown).

Figure 11:
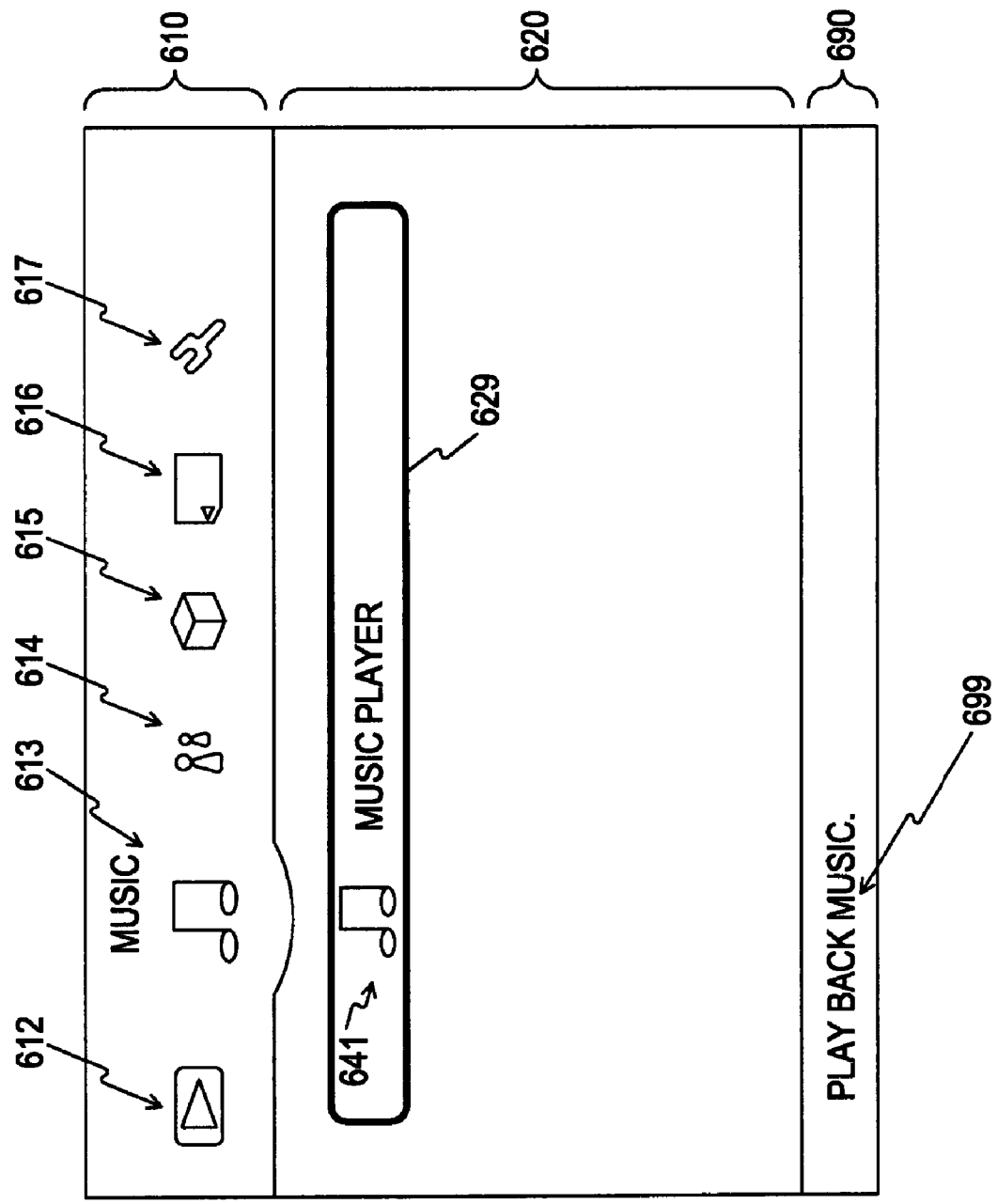
FIG. 11 shows an example a screen about a "music" category according to the embodiment of the present invention.

FIG. 11 shows an example of a screen about the "music" category according to the embodiment of the present invention. If the left button 143 is pressed once in the screen shown in FIG. 6, the screen shown in FIG. 11 is displayed.

In this screen, the "music" icon 613 and the category name "music" are displayed at the fixed position to be operated. That is, the press on the left button 143 allows all of the category icons in the category display area 610 to be shifted in the left direction, so that the "camera" icon 611, which is positioned at the left end in FIG. 6, is hidden.

In this screen, a "music player" icon 641, which is only one function of the "music" category, is surrounded by the selection frame 629. Accordingly, the function explanation 699 about the "music player" function is displayed in the function explanation display area 690. If the set button 145 is pressed in this state, a screen of the "music player" function is displayed.

Figure 12:
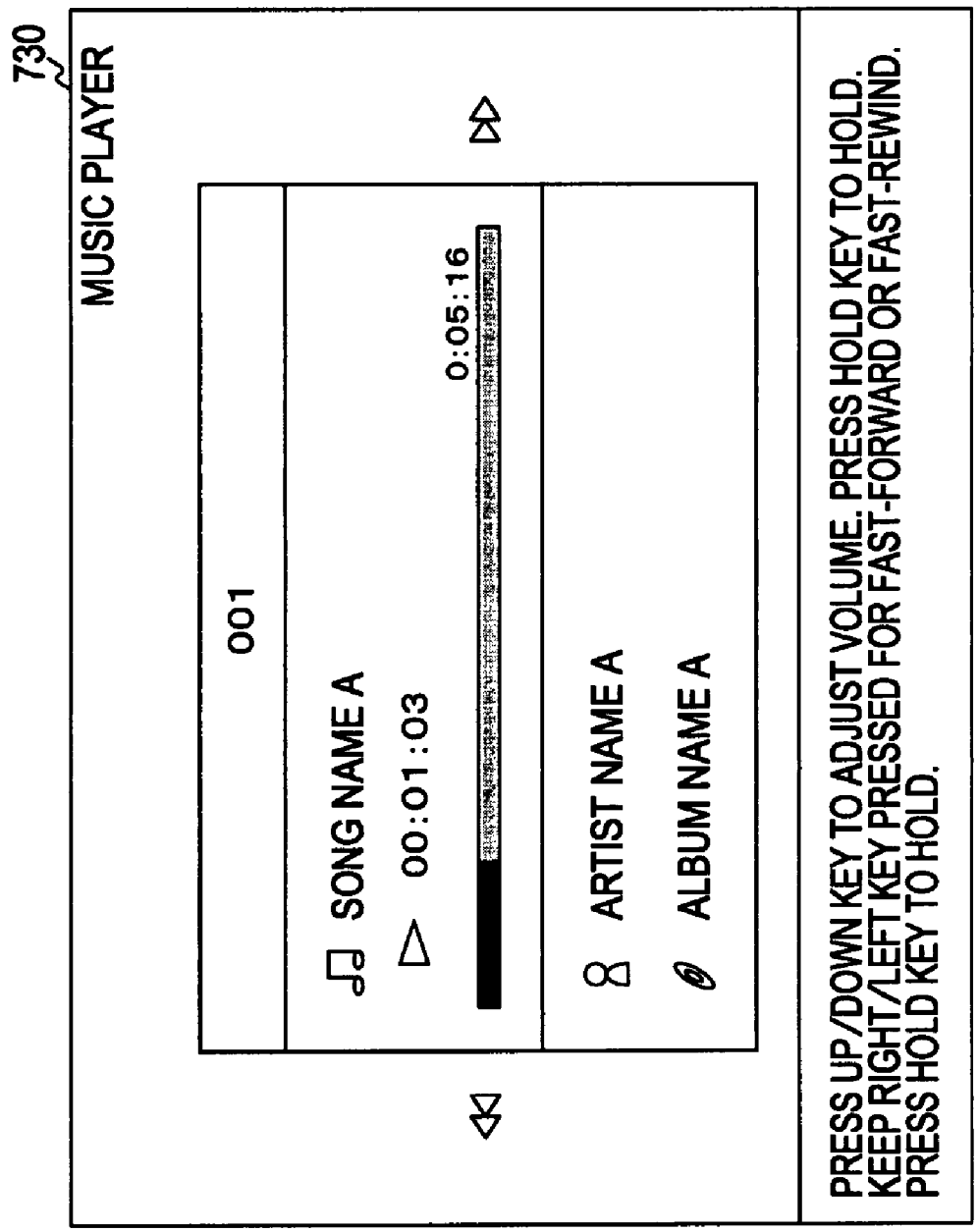
FIG. 12 shows an example of a screen 730 of a "music player" function according to the embodiment of the present invention.

FIG. 12 shows an example of a screen 730 of the "music player" function according to the embodiment of the present invention.

In this screen, an album name, an artist name, and a song name of the music that is currently played are displayed. Also, a current position in entire playback time is displayed. An explanation about an operating method is displayed at the bottom of the screen.

Figure 13:
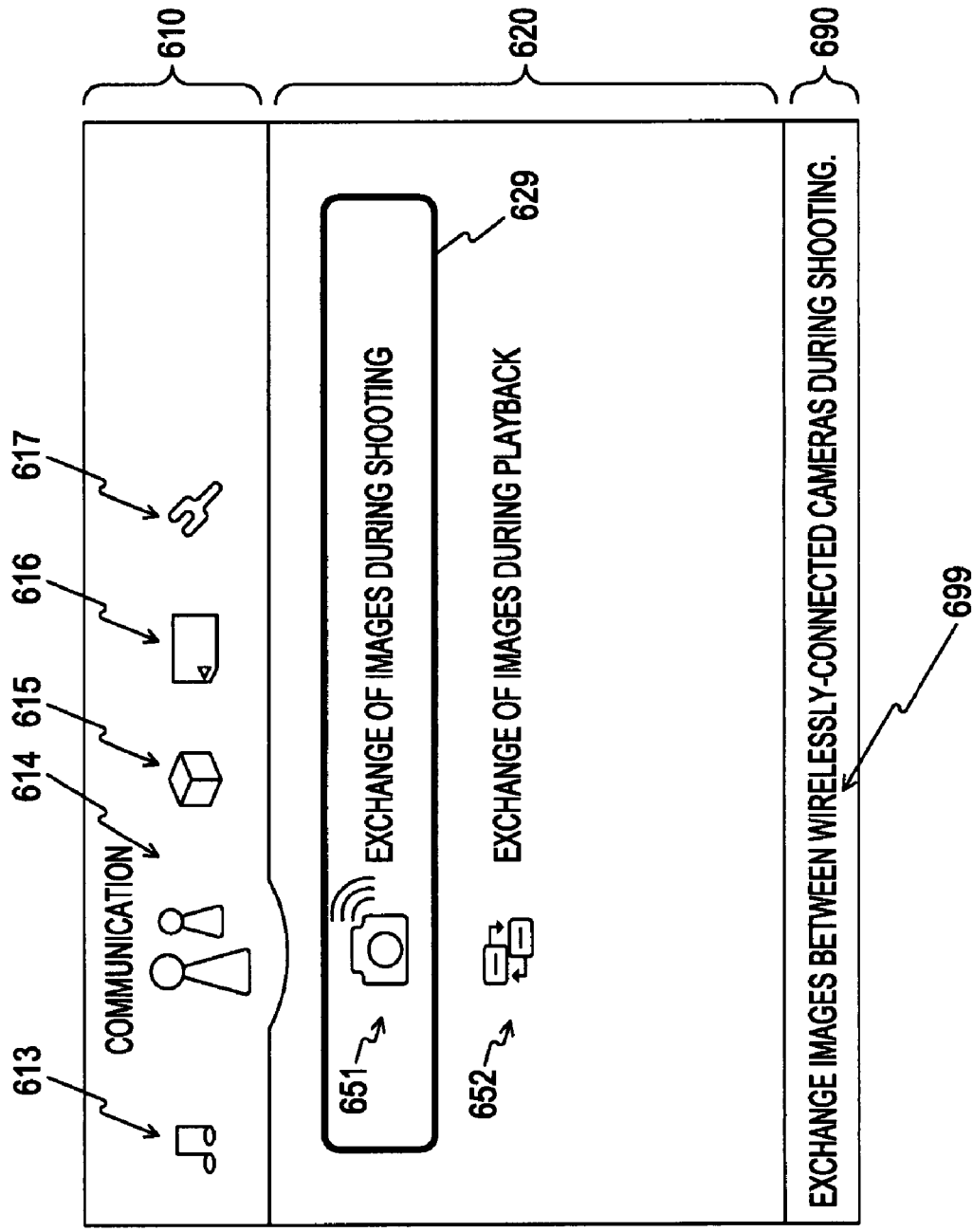
FIG. 13 shows an example a screen about a "communication" category according to the embodiment of the present invention.

FIG. 13 shows an example of a screen about the "communication" category according to the embodiment of the present invention. If the left button 143 is pressed once in the screen shown in FIG. 11, the screen shown in FIG. 13 is displayed.

In this screen, the "communication" icon 614 and the category name "communication" are displayed at the fixed position to be operated. That is, the press on the left button 143 allows all of the category icons in the category display area 610 to be shifted in the left direction, so that the "viewer" icon 612, which is positioned at the left end in FIG. 11, is hidden.

In this screen, an "exchange of images during shooting" icon 651 and an "exchange of images during playback" icon 652 are displayed, and the "exchange of images during shooting" icon 651 is surrounded by the selection frame 629. Accordingly, the function explanation 699 about the "exchange of images during shooting" function is displayed in the function explanation display area 690. If the set button 145 is pressed in this state, a screen of the "exchange of images during shooting" function is displayed.

Figure 14:
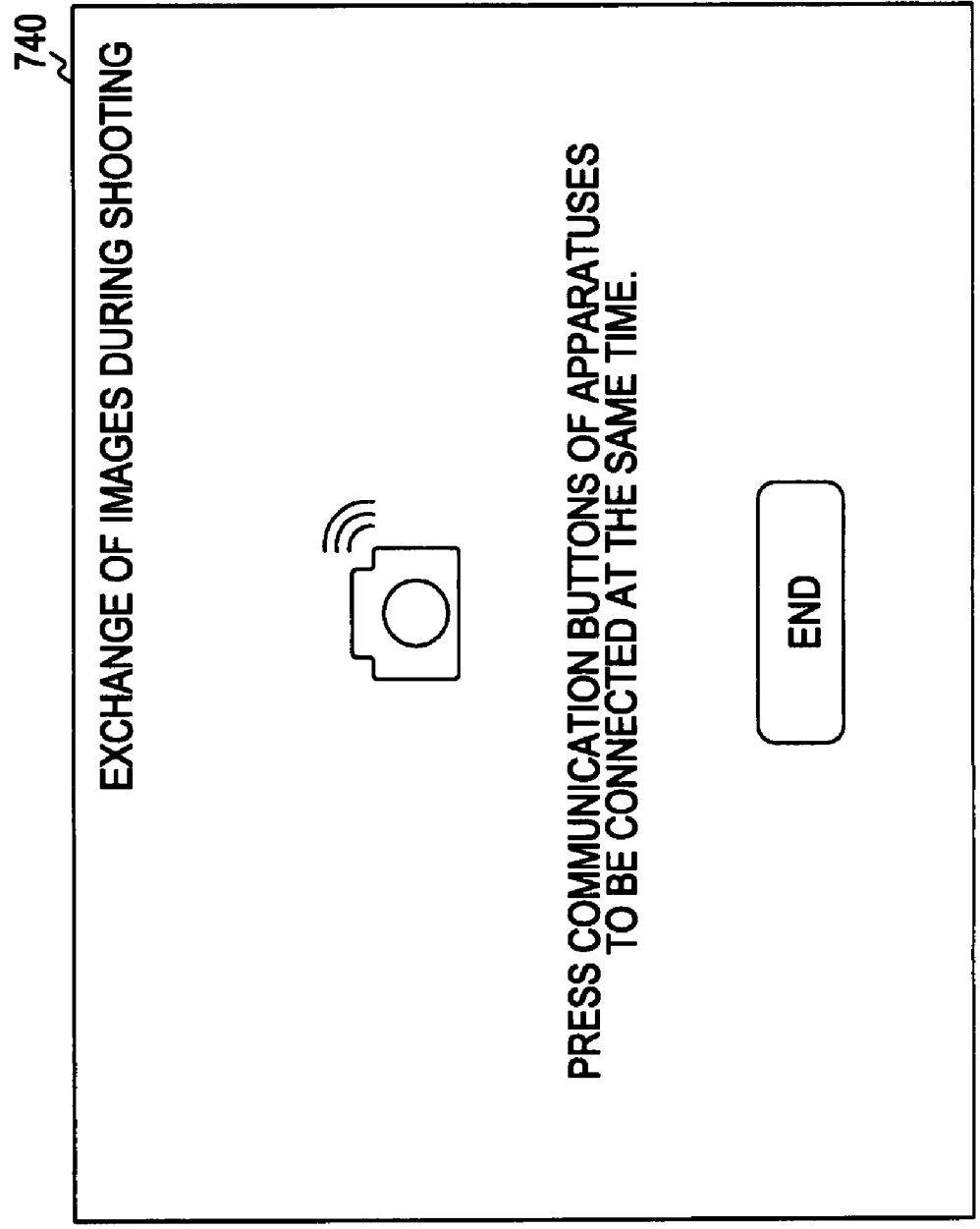
FIG. 14 shows an example of a screen 740 of an "exchange of images during shooting" function according to the embodiment of the present invention.

FIG. 14 shows an example of a screen 740 of the "exchange of images during shooting" function according to the embodiment of the present invention.

The "exchange of images during shooting" function is a function of exchanging images between wirelessly-connected digital still cameras. As a precondition, connection to a wireless network is performed in advance. The connection is performed one-on-one between two digital still cameras. An unconnected digital still camera performs an operation of connecting to one of wirelessly-connected digital still cameras, so as to be wirelessly-connected to the other digital still cameras connected to each other.

In the screen shown in FIG. 14, an operation of connecting to the wireless network is requested as a precondition of the "exchange of images during shooting" function. In response to the request, a user presses communication buttons (not shown) of the digital still cameras to be connected at the same time, so that wireless connection therebetween can be established. Then, if an image is captured by any of the digital still cameras, the captured image is distributed to the other wirelessly-connected digital still cameras. Herein, FIG. 14 shows an example of the "exchange of images during shooting" function, but connection to a wireless network is requested in the same manner also in the "exchange of images during playback" function.

Figure 15:
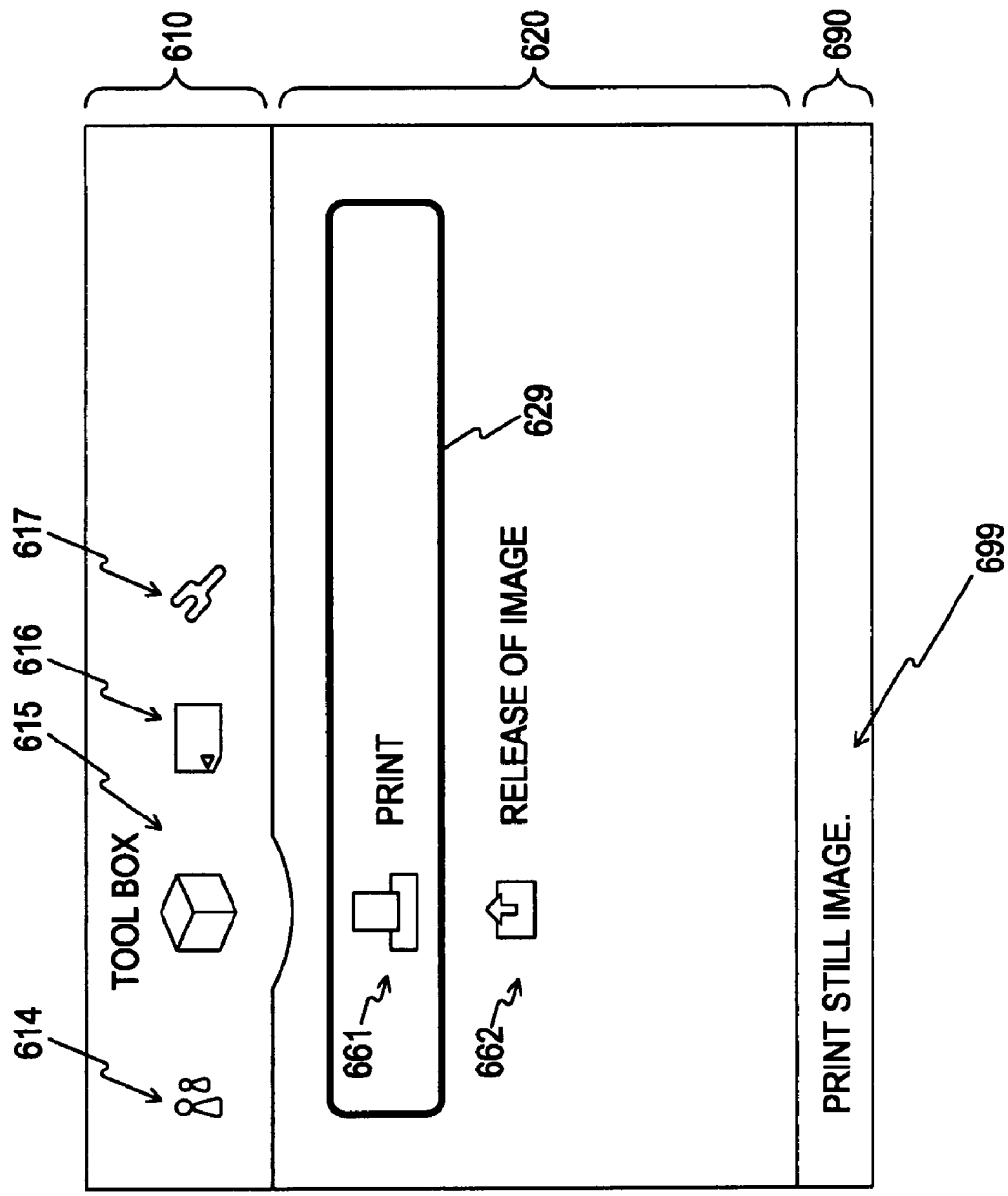
FIG. 15 shows an example a screen about a "tool box" category according to the embodiment of the present invention.

FIG. 15 shows an example of a screen about the "tool box" category according to the embodiment of the present invention. If the left button 143 is pressed once in the screen shown in FIG. 13, the screen shown in FIG. 15 is displayed.

In this screen, the "tool box" icon 614 and the category name "tool box" are displayed at the fixed position to be operated. That is, the press on the left button 143 allows all of the category display icons in the category display area 610 to be shifted in the left direction, so that the "music" icon 613, which is positioned at the left end in FIG. 13, is hidden.

In this screen, a "print" icon 661 and a "release of images" icon 662 are displayed, and the "print" icon 661 is surrounded by the selection frame 629. Accordingly, the function explanation 699 about the "print" function is displayed in the function explanation display area 690. If the set button 145 is pressed in this state, a screen of the "print" function is displayed.

FIG. 16 shows an example of a screen 750 of the "print" function according to the embodiment of the present invention.

The "print" function is a function of printing images. In this screen, "album", "memory stick", and "DPOF print" are displayed as items to be printed. "Album" is a button for printing an image in the album held in the built-in memory (not shown) of the digital still camera 100. "Memory stick" is a button for printing an image in the memory stick (not shown) loaded into the digital still camera 100. "DPOF print" is a button for printing an image by using a DPOF (digital print order format) function. The DPOF function is a function of reserving an image to be printed. By setting an image or images to be printed, the number of images, and items to be simultaneously output (e.g., time and title), a printing operation can be simplified.

FIG. 17 shows an example of a screen 760 of the "release of images" function according to the embodiment of the present invention.

The "release of images" function is a function of releasing images. In this screen, "execution" and "setting of access point" are displayed as items to be selected. "Execution" is a button for executing network connection for releasing images. "Setting of access point" is a button for setting an access point for the network connection. The images to be released are set in advance.

Figure 18:
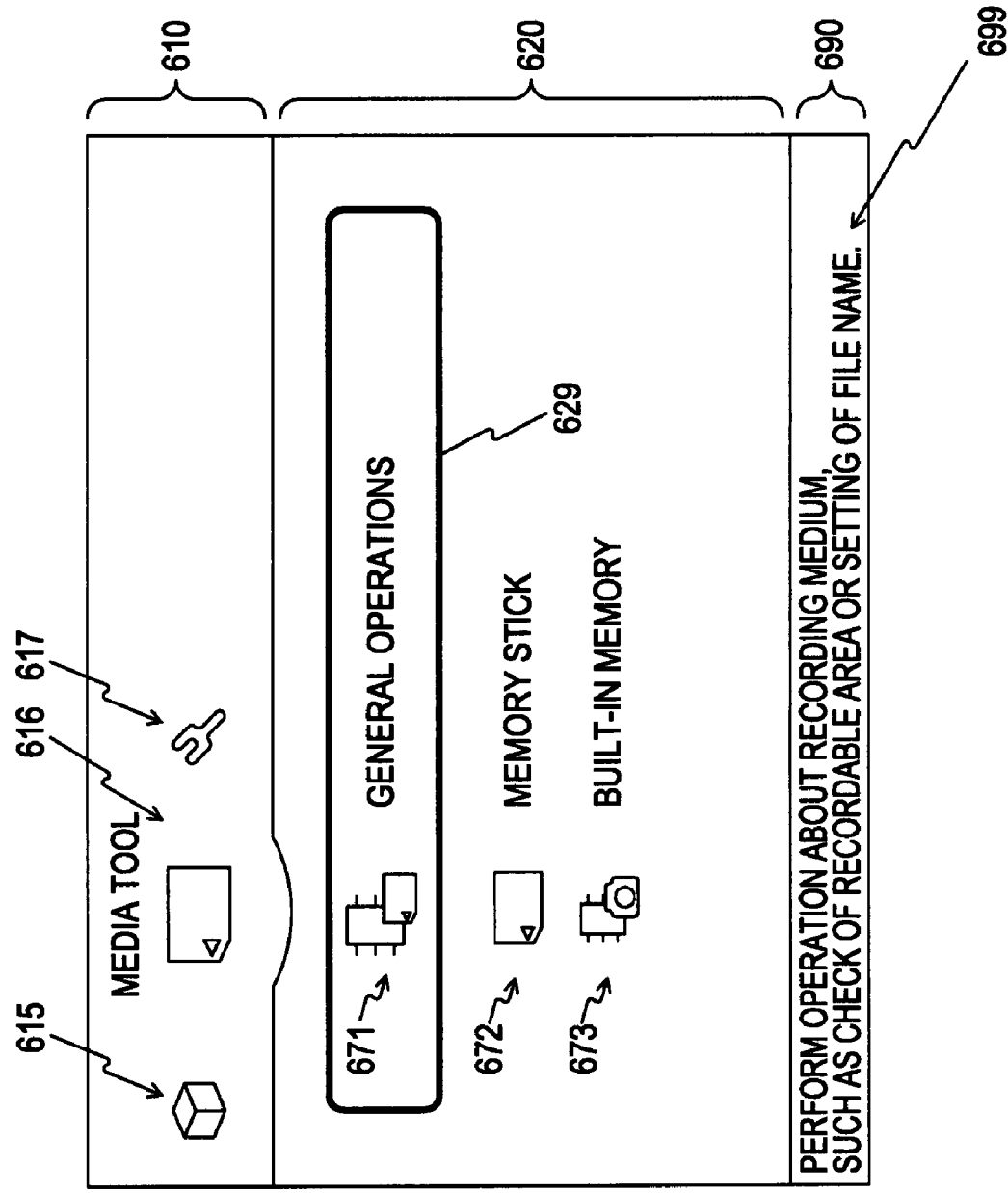
FIG. 18 shows an example a screen about a "media tool" category according to the embodiment of the present invention.

FIG. 18 shows an example of a screen about the "media tool" category according to the embodiment of the present invention. If the left button 143 is pressed once in the screen shown in FIG. 15, the screen shown in FIG. 18 is displayed.

In this screen, the "media tool" icon 616 and the category name "media tool" are displayed at the fixed position to be operated. That is, the press on the left button 143 allows all of the category icons in the category display area 610 to be shifted in the left direction, so that the "communication" icon 614, which is positioned at the left end in FIG. 15, is hidden.

In this screen, a "general operations" icon 671, a "memory stick" icon 672, and a "built-in memory" icon 673 are displayed, and the "general operations" icon 671 is surrounded by the selection frame 629. Accordingly, the function explanation 699 about the "general operations" function is displayed in the function explanation display area 690. If the set button 145 is pressed in this state, a screen of the "general operations" function is displayed.

Figure 19:
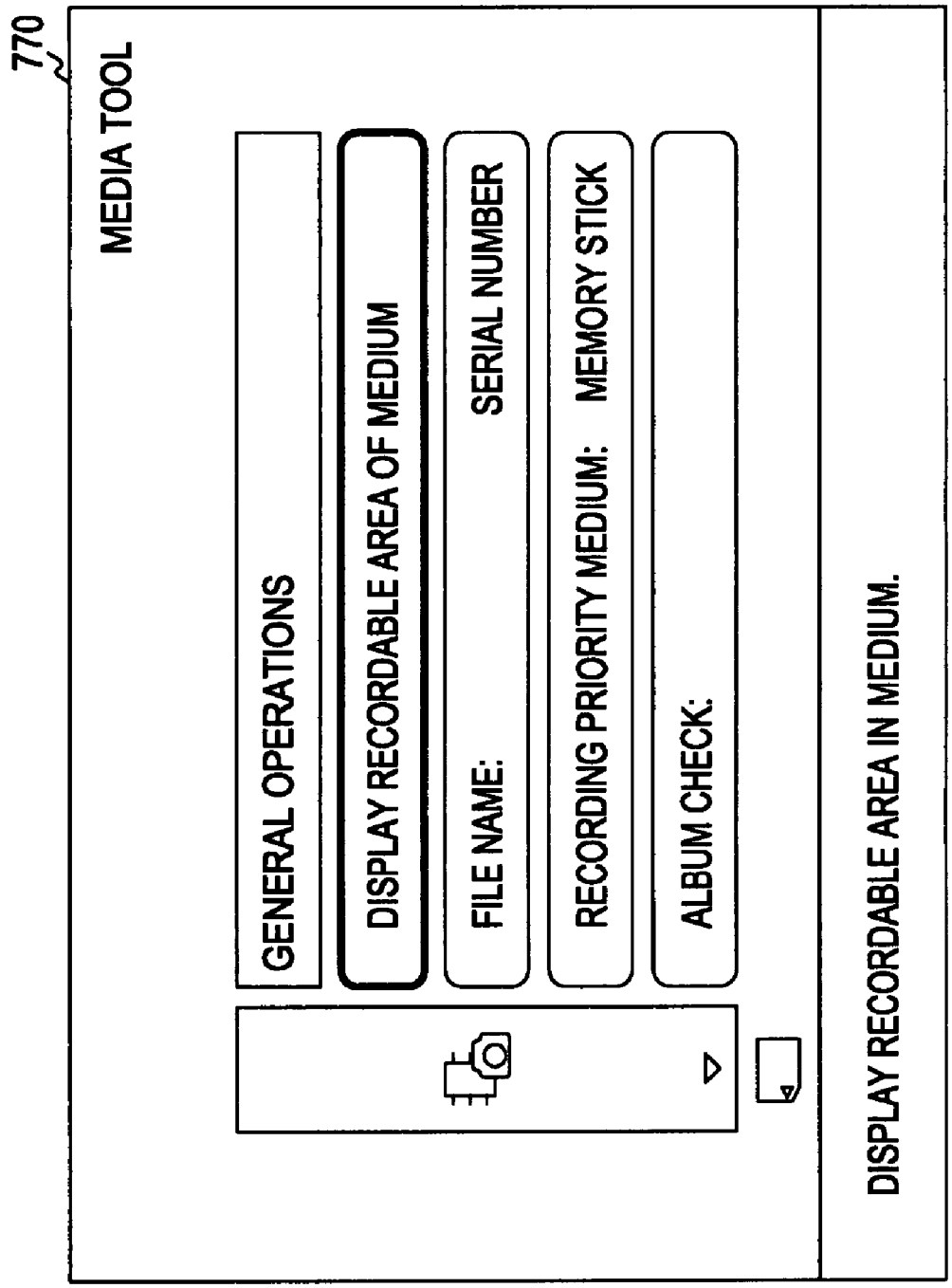
FIG. 19 shows an example of a screen 770 of a "general operations" function according to the embodiment of the present invention.

FIG. 19 shows an example of a screen 770 of the "general operations" function according to the embodiment of the present invention.

The "general operations" function is a function of providing general operations about a recording medium. In this screen, "display recordable area of medium", "file name", "recording priority medium", and "album check" are displayed as items to be selected. "Display recordable area of medium" is a button for displaying a recordable area of a recording medium. "File name" is a button for setting an assignment rule of a file name to be recorded. Herein, "serial numbers" to assign serial numbers to respective files is specified. "Recording priority medium" is a button for setting a recording medium on which an image is preferentially recorded at shooting. Herein, "memory stick" is specified. "Album check" is a button for recovering data when an album data error occurs.

Now, an operation of the digital still camera 100 according to the embodiment of the present invention is described with reference to the drawings.

Figure 20:
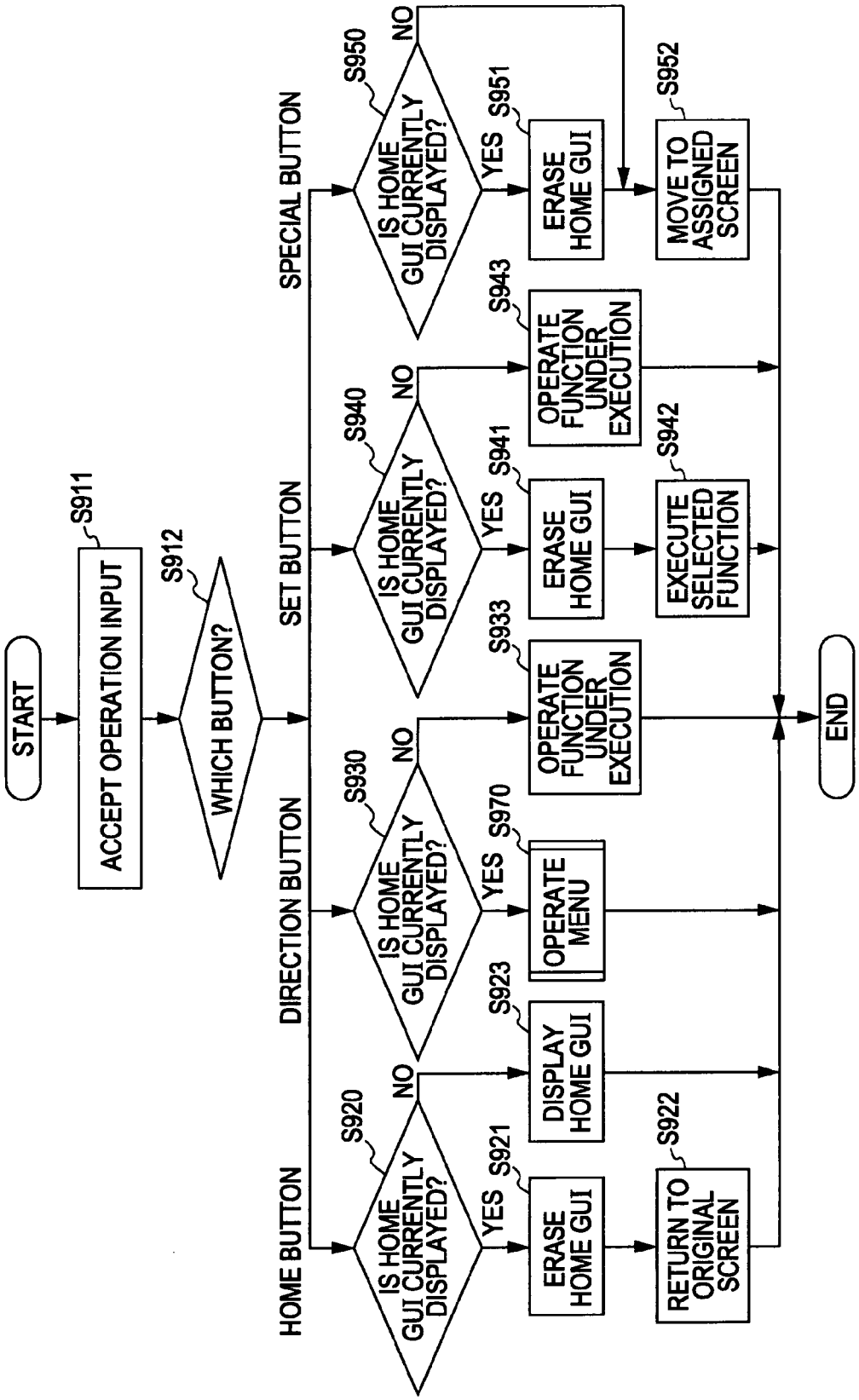
FIG. 20 shows an example of a process performed in accordance with an operation input to the digital still camera 100 according to the embodiment of the present invention.

FIG. 20 shows an example of a process performed in accordance with an operation input to the digital still camera 100 according to the embodiment of the present invention.

The operation accepting unit 210 accepts an operation input (step S911), and then the operation determining unit 220 determines content of the operation input (step S912). In accordance with a determination result, a process is performed in the following manner.

If the menu is displayed when the home button 160 is pressed (step S920), the menu screen 600 is inactivated (step S921) and the original screen 701 is displayed (step S922). On the other hand, if the menu is not displayed (step S920), the menu screen 600 is activated (step S923).

If the menu is displayed when one of the direction buttons 141 to 144 is pressed (step S930), the menu is operated on the menu screen 600 (step S970). On the other hand, if the menu is not displayed (step S930), an operation is performed on the screen of the function that is currently executed (step S933).

If the menu is displayed when the set button 145 is pressed (step S940), the menu screen 600 is inactivated (step S941), and the selected screen 702 is displayed (step S942). On the other hand, if the menu is not displayed (step S940), an operation is performed on the screen of the function that is currently executed (step S943).

If the menu is displayed when the special button (e.g., image capturing button 170 or the playback button 180) is pressed (step S950), the menu screen 600 is inactivated (step S951). Regardless of whether the menu is displayed, the special-button-related screen 703, which is a screen of the function assigned to the special button, is displayed (step S952).

Figure 21:
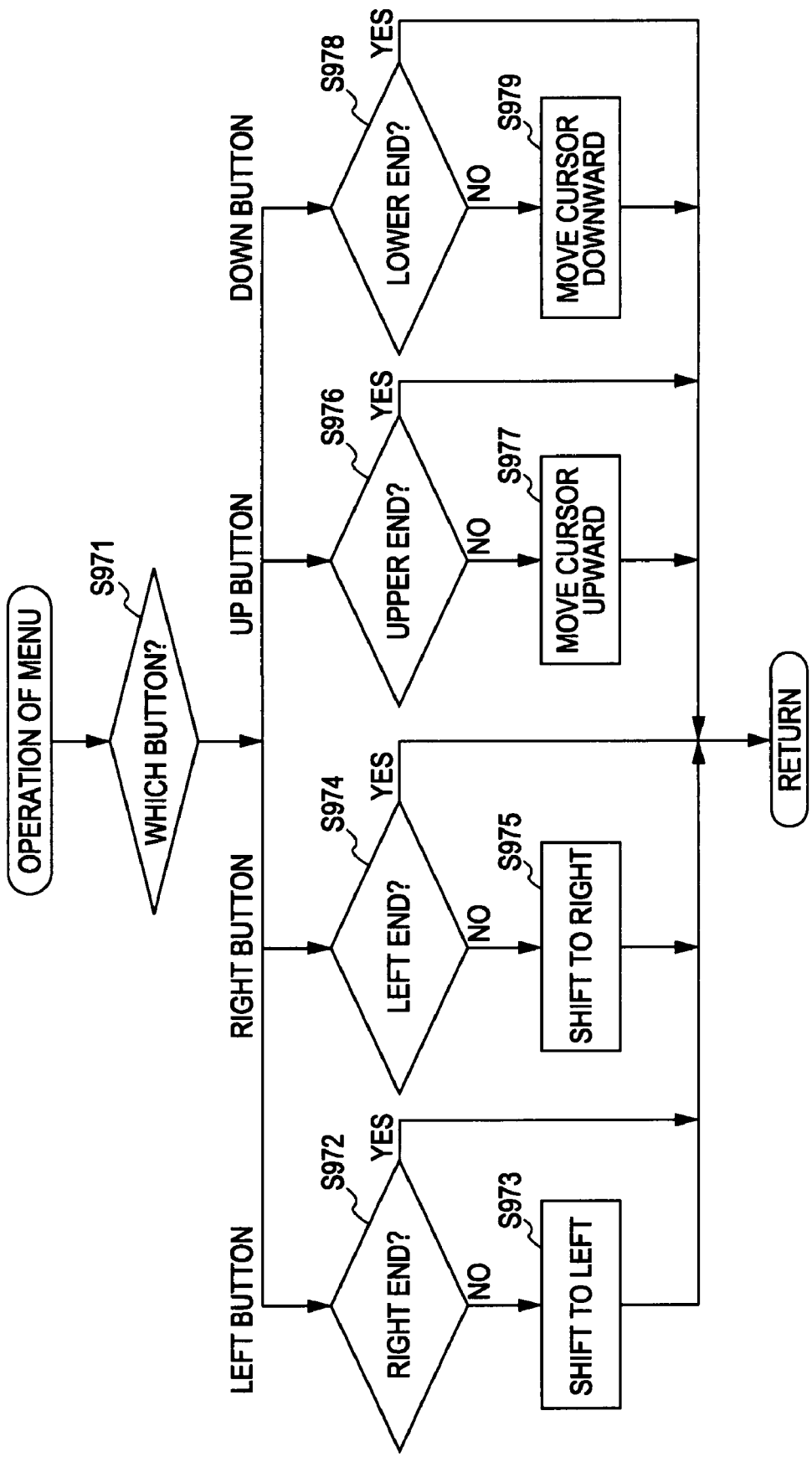
FIG. 21 shows an example of a process of operating a menu of the digital still camera 100 according to the embodiment of the present invention.

FIG. 21 shows an example of a menu operating process (step S970) performed in the digital still camera 100 according to the embodiment of the present invention.

The content of an operation input accepted by the operation accepting unit 210 is determined by the operation determining unit 220 (step S971). In accordance with a determination result, a process is performed in the following manner.

If the category to be operated in the category display area 610 is not at the right end when the left button 143 is pressed (step S972), all of the category icons are shifted in the left direction (step S973).

If the category to be operated in the category display area 610 is not at the left end when the right button 144 is pressed (step S974), all of the category icons are shifted in the right direction (step S975).

If the selected function in the function display area 620 is not at the top when the up button 141 is pressed (step S976), the selection frame 629 for surrounding a function icon is moved upward (step 977).

If the selected function in the function display area 620 is not at the bottom when the down button 142 is pressed (step S978), the selection frame 629 for surrounding a function icon is moved downward (step 979).

As described above, according to the embodiment of the present invention, the category display control unit 241 allows the category identifiers to be displayed in the category display area 610 along the horizontal direction, and the function display control unit 242 allows the function identifiers to be displayed in the function display area 620 along the vertical direction. Accordingly, the functions provided by the digital still camera 100 can be systematically displayed by the GUI.

The above-described embodiment of the present invention is an example to embody the present invention, and has a correspondence with specific elements in the following claims. However, the present invention is not limited to the embodiment, but various modifications can be carried out without deviating from the scope of the present invention.

That is, the function holding means corresponds to the function table 501. The identifier holding means corresponds to the icon table 502. The operation accepting means corresponds to the operation accepting unit 210. The category display control means corresponds to the category display control unit 241. The function display control means corresponds to the function display control unit 242.

The function explanation display control means corresponds to the function explanation display control unit 243.

The menu button corresponds to the home button 150.

The function holding means corresponds to the function table 501. The identifier holding means corresponds to the icon table 502. The operation accepting means corresponds to the operation accepting unit 210. Accepting an operation input corresponds to step S911. Determining whether the menu button has been pressed in the operation input corresponds to step S912. Determining whether a menu is displayed if the menu button has been pressed corresponds to step S920. Performing control so as to display category identifiers in the horizontal direction and to display function identifiers corresponding to the category to be operated in the vertical direction as the menu if the menu is not displayed corresponds to step S923. Performing control so as to inactivate the menu if the menu is displayed corresponds to step S921.

The steps described in the embodiment of the present invention may be regarded as a method including the series of steps, as a program allowing a computer to execute the series of steps, or as a recording medium storing the program.

The invention claimed is:

1. An image capturing apparatus comprising:
   function holding means for holding functions of the image capturing apparatus, the functions being classified into corresponding categories, and for holding function explanations corresponding to the functions;
   identifier holding means for holding category identifiers indicating the categories and function identifiers indicating the functions;
   category display control means for allowing the category identifiers to be displayed along the horizontal direction;
   function display control means for allowing the function identifiers corresponding to the category to be operated in accordance with an operation input to be displayed along the vertical direction;
   operation accepting means for accepting an operation input for selecting one of the function identifiers displayed by the function display control means; and
   function explanation display control means for allowing the function explanation corresponding to the function selected by the operation input to be displayed,
   in which the category display control means, the function display control means, and the function explanation display control means respectively enables the category identifiers, the function identifiers corresponding to the category to be operated in accordance with the operation input, and the function explanation corresponding to the function selected by the operation input to be displayed in a single display screen.

2. The image capturing apparatus according to claim 1, wherein the category display control means allows the category identifiers to be displayed above the function identifiers.

3. The image capturing apparatus according to claim 2, wherein the function display control means allows the function identifiers corresponding to the category identifier of the category to be operated by the operation input to be displayed under the category identifier.

4. The image capturing apparatus according to claim 2, wherein the category display control means allows the category identifier corresponding to the category to be operated by the operation input to be displayed at a fixed position, and, upon change of the category to be operated by the operation input, the category display control means moves the category identifiers so that the category identifier corresponding to the category to be newly operated is displayed at the fixed position.

5. The image capturing apparatus according to claim 4, wherein the category display control means allows all of the category identifiers to be displayed in an initial state.

6. The image capturing apparatus according to claim 1, wherein the operation accepting means includes a menu button to activate or inactivate display of the category identifiers and the function identifiers controlled by the category display control means and the function display control means.

7. The image capturing apparatus according to claim 6, wherein the operation accepting means further includes a special button to execute an assigned function.

8. The image capturing apparatus according to claim 7, further comprising:
control means for executing a predetermined function on the basis of the operation input accepted by the operation accepting means,
wherein, in the control means, a function executed on the basis of selection of one of the function identifiers is equal to a function executed by an operation of the special button.

9. The image capturing apparatus according to claim 1, wherein the categories of the image capturing apparatus include at least a category to capture an image of a subject, a category to play back a recorded image, and a category to transmit the recorded image through a network connected to the apparatus.

10. An electronic apparatus comprising:
function holding means for holding functions of the electronic apparatus, the functions being classified into corresponding categories, and for holding function explanations corresponding to the functions;
identifier holding means for holding category identifiers indicating the categories and function identifiers indicating the functions;
operation accepting means for accepting an operation input to select one of the function identifiers;
category display control means for performing control so that the category identifiers are displayed along the horizontal direction;
function display control means for performing control so that the function identifiers corresponding to the category to be operated in accordance with the operation input are displayed along the vertical direction; and
function explanation display control means for allowing the function explanation corresponding to the function selected by the operation input to be displayed,
in which the category display control means, the function display control means, and the function explanation display control means respectively enables the category identifiers, the function identifiers corresponding to the category to be operated in accordance with the operation input, and the function explanation corresponding to the function selected by the operation input to be displayed in a single display screen.

11. A display method in an electronic apparatus including function holding means for holding functions of the electronic apparatus, the functions being classified into corresponding categories, and for holding function explanations corresponding to the functions; identifier holding means for holding category identifiers indicating the categories and function identifiers indicating the functions; operation accepting means for accepting an operation input to select one of the function identifiers, the display method comprising:
accepting the operation input;
determining whether a menu button has been pressed in the operation input;
determining whether a menu is displayed if the menu button has been pressed;
performing control so as to display the category identifiers along the horizontal direction and to display the function identifiers corresponding to the category to be operated in accordance with the operation input along the vertical direction and to display the function explanation corresponding to the function selected by the operation input as the menu if the menu is not displayed, such that the category identifiers, the function identifiers corresponding to the category to be operated in accordance with the operation input, and the function explanation corresponding to the function selected by the operation input are displayed in a single display screen; and
performing control so as to inactivate display of the menu if the menu is displayed.

12. A computer readable recording medium having stored thereon a program allowing a computer to execute, in an electronic apparatus including function holding means for holding functions of the electronic apparatus, the functions being classified into corresponding categories, and for holding function explanations corresponding to the functions; identifier holding means for holding category identifiers indicating the categories and function identifiers indicating the functions; and operation accepting means for accepting an operation input to select one of the function identifiers,
accepting the operation input;
determining whether a menu button has been pressed in the operation input;
determining whether a menu is displayed if the menu button has been pressed;
performing control so as to display the category identifiers along the horizontal direction and to display the function identifiers corresponding to the category to be operated in accordance with the operation input along the vertical direction and to display the function explanation corresponding to the function selected by the operation input as the menu if the menu is not displayed, such that the category identifiers, the function identifiers corresponding to the category to be operated in accordance with the operation input, and the function explanation corresponding to the function selected by the operation input are displayed in a single display screen; and
performing control so as to inactivate display of the menu if the menu is displayed.

13. An image capturing apparatus comprising:
a function holding unit configured to hold functions of the image capturing apparatus, the functions being classified into corresponding categories, and for holding function explanations corresponding to the functions;
an identifier holding unit configured to hold category identifiers indicating the categories and function identifiers indicating the functions;
a category display control unit configured to allow the category identifiers to be displayed along the horizontal direction;
a function display control unit configured to allow the function identifiers corresponding to the category to be operated in accordance with an operation input to be displayed along the vertical direction;
an operation accepting unit configured to accept an operation input for selecting one of the function identifiers displayed by the function display control unit; and
function explanation display control unit configured to allow the function explanation corresponding to the function selected by the operation input to be displayed,
in which the category display control unit, the function display control unit, and the function explanation display control unit respectively enables the category identifiers, the function identifiers corresponding to the category to be operated in accordance with the operation input, and the function explanation corresponding to the function selected by the operation input to be displayed in a single display screen.

14. An electronic apparatus comprising:
a function holding unit configured to hold functions of the electronic apparatus, the functions being classified into corresponding categories, and for holding function explanations corresponding to the functions;
an identifier holding unit configured to hold category identifiers indicating the categories and function identifiers indicating the functions;
an operation accepting unit configured to accept an operation input to select one of the function identifiers;
a category display control unit configured to perform control so that the category identifiers are displayed along the horizontal direction;
a function display control unit configured to perform control so that the function identifiers corresponding to the category to be operated in accordance with the operation input are displayed along the vertical direction; and
function explanation display control unit configured to allow the function explanation corresponding to the function selected by the operation input to be displayed,
in which the category display control unit, the function display control unit, and the function explanation display control unit respectively enables the category identifiers, the function identifiers corresponding to the category to be operated in accordance with the operation input, and the function explanation corresponding to the function selected by the operation input to be displayed in a single display screen.

15. An image capturing apparatus comprising:
function holding means for holding functions of the image capturing apparatus, the functions being classified into corresponding categories, and for holding function explanations corresponding to the functions;
identifier holding means for holding category identifiers indicating the categories and function identifiers indicating the functions;
category display control means for allowing the category identifiers to be displayed along a first direction;
function display control means for allowing the function identifiers corresponding to the category to be operated in accordance with an operation input to be displayed along a second direction which is different from the first direction;
operation accepting means for accepting an operation input for selecting one of the function identifiers displayed by the function display control means; and
function explanation display control means for allowing the function explanation corresponding to the function selected by the operation input to be displayed,
in which the category display control means, the function display control means, and the function explanation display control means respectively enables the category identifiers, the function identifiers corresponding to the category to be operated in accordance with the operation input, and the function explanation corresponding to the function selected by the operation input to be displayed in a single display screen.

* * * * *